United States Patent
Hirano et al.

(10) Patent No.: US 10,877,228 B2
(45) Date of Patent: Dec. 29, 2020

(54) OPTICAL COUPLING DEVICE AND METHOD FOR PRODUCING OPTICAL COUPLING DEVICE

(71) Applicant: SUMITOMO ELECTRIC INDUSTRIES, LTD., Osaka (JP)

(72) Inventors: Mitsuharu Hirano, Osaka (JP); Akira Furuya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/543,732

(22) Filed: Aug. 19, 2019

(65) Prior Publication Data

US 2020/0073066 A1   Mar. 5, 2020

(30) Foreign Application Priority Data

Sep. 4, 2018 (JP) .................................. 2018-165457

(51) Int. Cl.
*G02B 6/42* (2006.01)

(52) U.S. Cl.
CPC ........... *G02B 6/4239* (2013.01); *G02B 6/424* (2013.01)

(58) Field of Classification Search
None
See application file for complete search history.

(56) References Cited

U.S. PATENT DOCUMENTS

| 5,185,835 | A | * | 2/1993 | Vial | G02B 6/30 385/49 |
|---|---|---|---|---|---|
| 7,021,842 | B2 | * | 4/2006 | Yamada | G02B 6/3636 385/136 |
| 2003/0152343 | A1 | * | 8/2003 | Yamada | G02B 6/3846 385/99 |
| 2011/0242835 | A1 | * | 10/2011 | Masuko | G02B 6/4239 362/551 |
| 2020/0073066 | A1 | * | 3/2020 | Hirano | G02B 6/4239 |

FOREIGN PATENT DOCUMENTS

| JP | 11084164 | A | * | 3/1999 |
| JP | 2002139653 | A | * | 5/2002 |
| JP | 2003-156662 | | | 5/2003 |
| JP | 2005134528 | A | * | 5/2005 |

* cited by examiner

*Primary Examiner* — Rhonda S Peace
(74) *Attorney, Agent, or Firm* — Smith, Gambrell & Russell, LLP.

(57) ABSTRACT

An optical coupling device including a plurality of optical fibers, each including first and second bared optical fiber portions, and first and second coated optical fiber portions; a holder including a first component having a first surface and a rear end, a second component disposed on the first surface of the first component and on the first bared optical fiber portions, and an adhesive resin body disposed between the first surface of the first component and the second component; a first resin body in contact with the first coated optical fiber portions and the first component; and a second resin body extending along the rear end of the first component and covering the first coated optical fiber portions. The first resin body is disposed between the adhesive resin body and the second resin body. The second resin body has a lower Young's modulus than the first resin body.

9 Claims, 20 Drawing Sheets

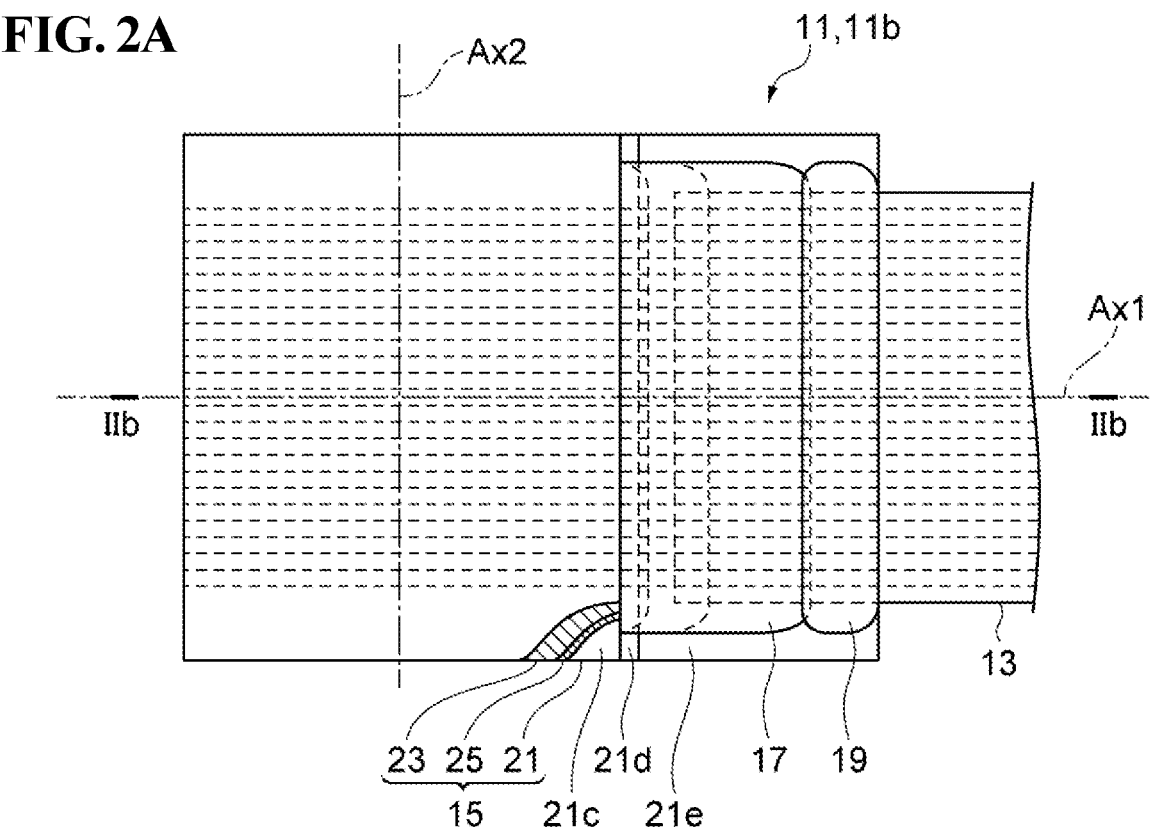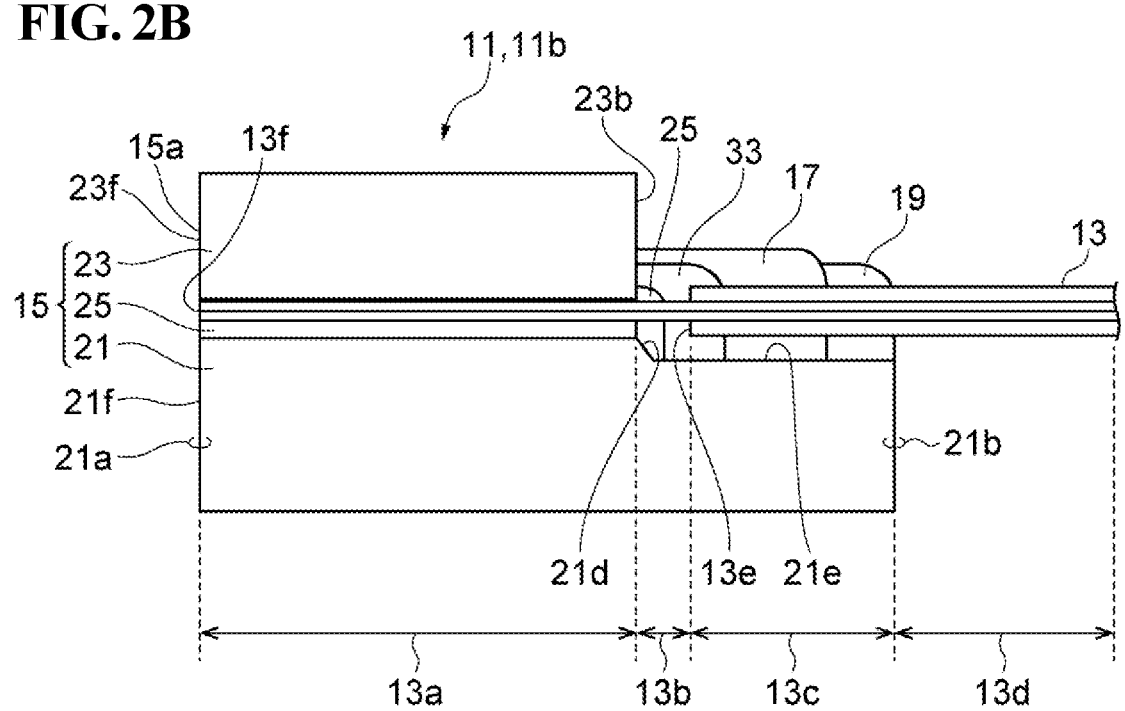

OPTICAL COUPLING DEVICE AND METHOD FOR PRODUCING OPTICAL COUPLING DEVICE

BACKGROUND OF THE INVENTION

1. Field of the Invention

The present invention relates to optical coupling devices and methods for producing optical coupling devices.

2. Description of the Related Art

Japanese Unexamined Patent Application Publication No. 2003-156662 discloses an optical fiber array.

SUMMARY OF THE INVENTION

Optical coupling devices allow an optical device including a plurality of optical elements to be optically coupled to an array of optical fibers. An optical coupling device includes external optical fibers extending out of a holder holding an array of optical fibers. The optical fibers in the holder are subjected to external force applied to the external optical fibers. Optical coupling devices need to resist such external force.

After conducting research, the inventors have found a structure suitable for resisting the longitudinal component of applied external force along the waveguide axes of optical fibers and a structure suitable for resisting the transverse component of applied external force crossing the waveguide axes of optical fibers.

An aspect of the present invention is to provide an optical coupling device capable of resisting the longitudinal and transverse components of applied external force. An another aspect of the present invention is to provide a method for producing an optical coupling device capable of resisting the longitudinal and transverse components of applied external force.

An optical coupling device according to one aspect of the present invention includes a plurality of optical fibers, each including a first bared optical fiber portion, a second bared optical fiber portion, a first coated optical fiber portion, and a second coated optical fiber portion that are arranged in sequence in a direction of a waveguide axis; a holder including a first component having a front end and a rear end and having a first surface, a step, and a second surface that are arranged in a first direction from the front end toward the rear end, a second component disposed on the first surface of the first component and the first bared optical fiber portions and separated from the second surface, and an adhesive resin body disposed between the first surface of the first component and the second component; a first resin body in contact with the first coated optical fiber portions and the first component; and a second resin body extending along the rear end of the first component and covering the first coated optical fiber portions. The first resin body is disposed between the adhesive resin body and the second resin body. The second coated optical fiber portions extend out of the holder. The second resin body has a lower Young's modulus than the first resin body.

A method for producing an optical coupling device according to another aspect of the present invention includes providing a first member, a plurality of optical fibers, and a second member, the first member having a first end and a second end and having a first surface, a step, and a second surface that are arranged in a first direction from the first end toward the second end, the optical fibers each including a first portion, a second portion, and a third portion that are arranged in sequence in the direction of the waveguide axis; forming an adhesive resin body securing together the first portions of the optical fibers, the first member, and the second member such that the first portions and the second portions of the optical fibers are disposed over the first surface and the second surface, respectively; after forming the adhesive resin body, dispensing a first adhesive onto the optical fibers and the second surface of the first member while moving a first nozzle over the second surface and the optical fibers across the optical fibers at a distance from the second end of the first member, and solidifying the first adhesive to form a first resin body such that the optical fibers are separated from the second surface; and after forming the first resin body, dispensing a second adhesive onto the optical fibers and the second surface along the second end of the first member while moving a second nozzle across the optical fibers, and solidifying the second adhesive to form a second resin body such that the optical fibers are separated from the second surface. The second resin body has a lower Young's modulus than the first resin body.

The above and other objects, features, and advantages of the present invention will become more readily apparent from the following detailed description of preferred embodiments of the present invention taken in conjunction with the accompanying drawings.

BRIEF DESCRIPTION OF THE DRAWINGS

FIG. 2A is a plan view of the optical coupling device according to the embodiment.

FIG. 2B is a sectional view taken along line IIb-IIb in FIG. 2A.

DESCRIPTION OF THE PREFERRED EMBODIMENTS

Figure 1A:
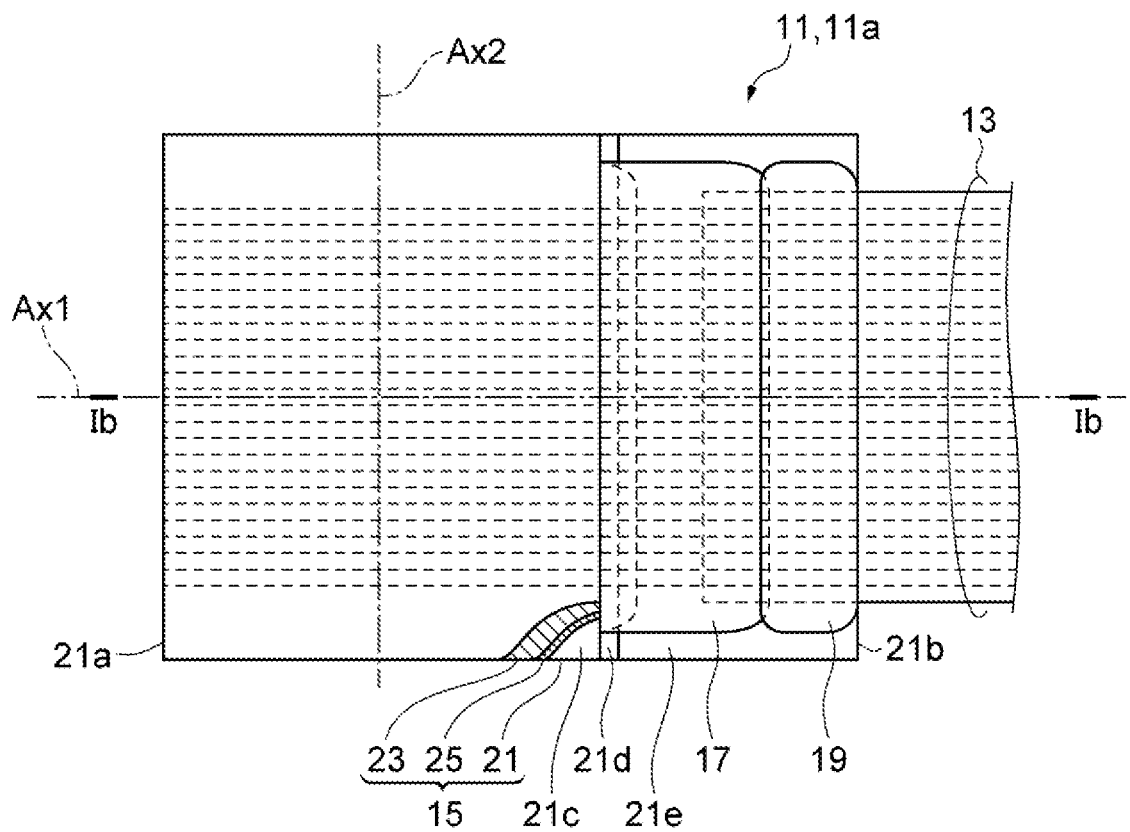
FIG. 1A is a plan view of an optical coupling device according to one embodiment.

Some specific examples will now be described.

A specific example of an optical coupling device includes (a) a plurality of optical fibers, each including a first bared optical fiber portion, a second bared optical fiber portion, a first coated optical fiber portion, and a second coated optical fiber portion that are arranged in sequence in a direction of a waveguide axis; (b) a holder including a first component having a front end and a rear end and having a first surface, a step, and a second surface that are arranged in a first direction from the front end toward the rear end, a second component disposed on the first surface of the first component and the first bared optical fiber portions and separated from the second surface, and an adhesive resin body disposed between the first surface of the first component and the second component; (c) a first resin body in contact with the first coated optical fiber portions and the first component; and (d) a second resin body extending along the rear end of the first component and covering the first coated optical fiber portions. The first resin body is disposed between the adhesive resin body and the second resin body. The second coated optical fiber portions extend out of the holder. The second resin body has a lower Young's modulus than the first resin body.

In the optical coupling device, the first resin body is in contact with the first coated optical fiber portions and the first component and secures the optical fibers to the first component. In some situations, force may be externally applied to the second coated optical fiber portions extending out of the holder of the optical coupling device. Since the first resin body has a higher Young's modulus, the first resin body retains the optical fibers secured to the first component so as to resist the component, in the direction of the waveguide axis, of the force acting from the second coated optical fiber portions toward the first coated optical fiber portions. The second resin body covers the first coated optical fiber portions over the first component. Since the second resin body has a lower Young's modulus, the second resin body can secure the optical fibers to the first component so as to resist the component, in a direction crossing the waveguide axis, of the force mentioned above. In addition, the second resin body has less tendency to transmit the deformation (e.g., thermal deformation) of the first component to the optical fibers.

In a specific example of an optical coupling device, the first resin body is in contact with the second resin body. The first resin body extends over the second bared optical fiber portions and the first coated optical fiber portions of the plurality of optical fibers. The first resin body covers the adhesive resin body and is in contact with the second component and the adhesive resin body.

In the optical coupling device, the first resin body extends over the second bared optical fiber portions and the first coated optical fiber portions so that coating ends located at the boundaries between the second bared optical fiber portions and the first coated optical fiber portions are covered with a single resin. The coating ends are covered by the first resin body, which is different from the resin body that is directly subjected to force from the second coated optical fiber portions, i.e., the second resin body. The first resin body, which has a higher Young's modulus, extends over the optical fibers and the first component at a distance from the rear end of the first component and secures the optical fibers to the first component. The first resin body is in contact with the adhesive resin body and the second component and resists the force component in the direction of the waveguide axis.

A specific example of an optical coupling device further includes a third resin body disposed between the adhesive resin body and the second resin body. The third resin body covers the boundaries between the second bared optical fiber portions and the first coated optical fiber portions.

In the optical coupling device, the first resin body, which has a higher Young's modulus, is in contact with the first coated optical fiber portions and the first component and secures the optical fibers to the first component so as to resist the force component applied in the direction of the waveguide axis. The third resin body covers the coating ends at the boundaries between the second bared optical fiber portions and the first coated optical fiber portions. The third resin body thus prevents the first resin body, which resists external force, from being in contact with the optical fiber boundaries and the second bared optical fiber portions. The coating ends are covered by the third resin body, which is different from the resin bodies that are directly subjected to force from the second coated optical fiber portions, i.e., the first resin body and the second resin body.

In a specific example of an optical coupling device, the first resin body covers the third resin body so as to reach the second component. The third resin body has a higher Young's modulus than the second resin body.

In the optical coupling device, the third resin body separates the first resin body from the optical fiber boundaries between the second bared optical fiber portions and the first coated optical fiber portions. The third resin body thus prevents the first resin body, which resists external force, from being in contact with the optical fiber boundaries and the second bared optical fiber portions. The third resin body, which has a higher Young's modulus, is in contact with the second component and can thus secure the second bared optical fiber portions and the optical fiber boundaries to the second component. In addition, the third resin body can secure the coating ends and the portions on the front and rear sides thereof to the first component independently of the second resin body.

In a specific example of an optical coupling device, the first resin body is separated from the boundaries between the second bared optical fiber portions and the first coated optical fiber portions and from the second component. The third resin body covers the adhesive resin body and is in contact with the second component. The third resin body has a higher Young's modulus than the second resin body.

In the optical coupling device, the third resin body separates the first resin body from the coating ends at the boundaries between the second bared optical fiber portions and the first coated optical fiber portions. The third resin body thus prevents the first resin body, which resists external force, from being in contact with the second bared optical fiber portions and the coating ends at the optical fiber boundaries. In addition, the third resin body can firmly secure the coating ends and the portions on the front and rear sides thereof to the first component independently of the second resin body. The third resin body, which has a higher Young's modulus, is in contact with the second component and can thus secure the second bared optical fiber portions and the optical fiber boundaries to the second component. In addition, the third resin body has less tendency to transmit the deformation of the first component and the second component to the optical fibers.

In a specific example of an optical coupling device, the first coated optical fiber portions are separated from the second surface of the first component.

In the optical coupling device, the first coated optical fiber portions and the second bared optical fiber portions of the optical fibers are less susceptible to the deformation of the first component.

A specific example of a method for producing an optical coupling device includes (a) providing a first member, a plurality of optical fibers, and a second member, the first member having a first end and a second end and having a first surface, a step, and a second surface that are arranged in a first direction from the first end toward the second end, the optical fibers each including a first portion, a second portion, and a third portion that are arranged in sequence in the direction of the waveguide axis; (b) forming an adhesive resin body securing together the first portions of the optical fibers, the first member, and the second member such that the first portions and the second portions of the optical fibers are disposed over the first surface and the second surface, respectively; (c) after forming the adhesive resin body, dispensing a first adhesive onto the optical fibers and the second surface of the first member while moving a first nozzle over the second surface and the optical fibers across the optical fibers at a distance from the second end of the first member, and solidifying the first adhesive to form a first resin body such that the optical fibers are separated from the second surface; and (d) after forming the first resin body, dispensing a second adhesive onto the optical fibers and the second surface along the second end of the first member while moving a second nozzle across the optical fibers, and solidifying the second adhesive to form a second resin body such that the optical fibers are separated from the second surface. The second resin body has a lower Young's modulus than the first resin body.

In the method for producing an optical coupling device, the first resin body, which has a higher Young's modulus, is in contact with the second portions of the optical fibers and the first member. The first resin body can thus secure the optical fibers to the first member so as to resist the force component, in the direction of the waveguide axis, of force applied from the third portions of the optical fibers to the second portions of the optical fibers. The second resin body, which has a lower Young's modulus, extends along the second end so as to cover the second portions of the optical fibers. The second resin body can thus secure the optical fibers to the first member so as to resist the force component in a direction crossing the waveguide axis. In addition, the second resin body has less tendency to transmit the deformation (e.g., thermal deformation) of the first member to the optical fibers. Since the optical fibers are separated from the first member by the adhesives, the second portions of the optical fibers are less susceptible to the deformation of the first member.

In a specific example of a method for producing an optical coupling device, the first portions of the optical fibers each include a first bared optical fiber. The second portions of the optical fibers each include a second bared optical fiber and a first coated optical fiber. The third portions of the optical fibers each include a second coated optical fiber. The first bared optical fibers, the second bared optical fibers, the first coated optical fibers, and the second coated optical fibers are arranged in sequence in the direction of the waveguide axis.

In the method for producing an optical coupling device, each optical fiber has a coating end of a coating resin body at the boundary between the second bared optical fiber and the first coated optical fiber.

In a specific example of a method for producing an optical coupling device, the first resin body is in contact with the second resin body. The first resin body extends over the second bared optical fibers in a second direction crossing the first direction. The first resin body covers the adhesive resin body and is in contact with the second member and the adhesive resin body.

In the method for producing an optical coupling device, the first resin body, which has a higher Young's modulus, covers the adhesive resin body, the second portions of the optical fibers, and the coating ends. The first resin body covers the adhesive resin body and reaches the rear end surface of the second member.

A specific example of a method for producing an optical coupling device further includes, after forming the first resin body and before forming the second resin body, dispensing a third adhesive onto the optical fibers and the second surface across the optical fibers and solidifying the third adhesive to form a third resin body such that the optical fibers are separated from the second surface. The third resin body covers coating ends located at the boundaries between the second bared optical fibers and the first coated optical fibers.

In the method for producing an optical coupling device, the third adhesive covers the coating ends at the boundaries between the second bared optical fiber portions and the first coated optical fiber portions. The third adhesive thus prevents the first resin body and the second resin body, which resist external force, from being in contact with the optical fiber boundaries and the second bared optical fiber portions. The coating ends are covered by the third adhesive, which is different from the adhesive that is directly subjected to force from the second coated optical fiber portions, i.e., the second adhesive. The third resin body is in contact with the first resin body and the second member.

In a specific example of a method for producing an optical coupling device, the third adhesive is in contact with the first resin body and the second member. The third adhesive is dispensed onto coating ends located at the boundaries between the second bared optical fibers and the first coated optical fibers while a third nozzle is being moved across the optical fibers. The third resin body has a higher Young's modulus than the second resin body.

In the method for producing an optical coupling device, the third resin body, which has a higher Young's modulus, is in contact with the first coated optical fiber portions and the first member. The third resin body can thus secure the optical fibers to the first member so as to resist the force component applied in the direction of the waveguide axis. The third resin body can secure the second bared optical fiber portions and the optical fiber boundaries to the second member. In addition, the third resin body can firmly secure the coating ends and the portions on the front and rear sides thereof to the first member independently of the first resin body.

In a specific example of a method for producing an optical coupling device, the third adhesive is in contact with the first resin body and the second member. The third adhesive is dispensed onto coating ends located at the boundaries between the second bared optical fibers and the first coated optical fibers while a third nozzle is being moved across the optical fibers. The third resin body has a lower Young's modulus than the first resin body.

In the method for producing an optical coupling device, the third resin body is in contact with the first coated optical fibers and the first member. The third resin body can thus secure the optical fibers to the first member. The third resin body, which has a lower Young's modulus, reaches the second member so as to cover the adhesive resin body. The third resin body can thus secure the second bared optical fibers and the optical fiber boundaries to the first member and the second member. In addition, the third resin body has less tendency to transmit the deformation of the first member to the optical fibers.

The findings of the present invention can be easily understood from the following detailed description with reference to the accompanying drawings, which are given by way of example. Next, an optical coupling device and a method for manufacturing the optical coupling device according to one embodiment will now be described with reference to the accompanying drawings. Where possible, like parts are denoted by like reference numerals.

Figure 1B:
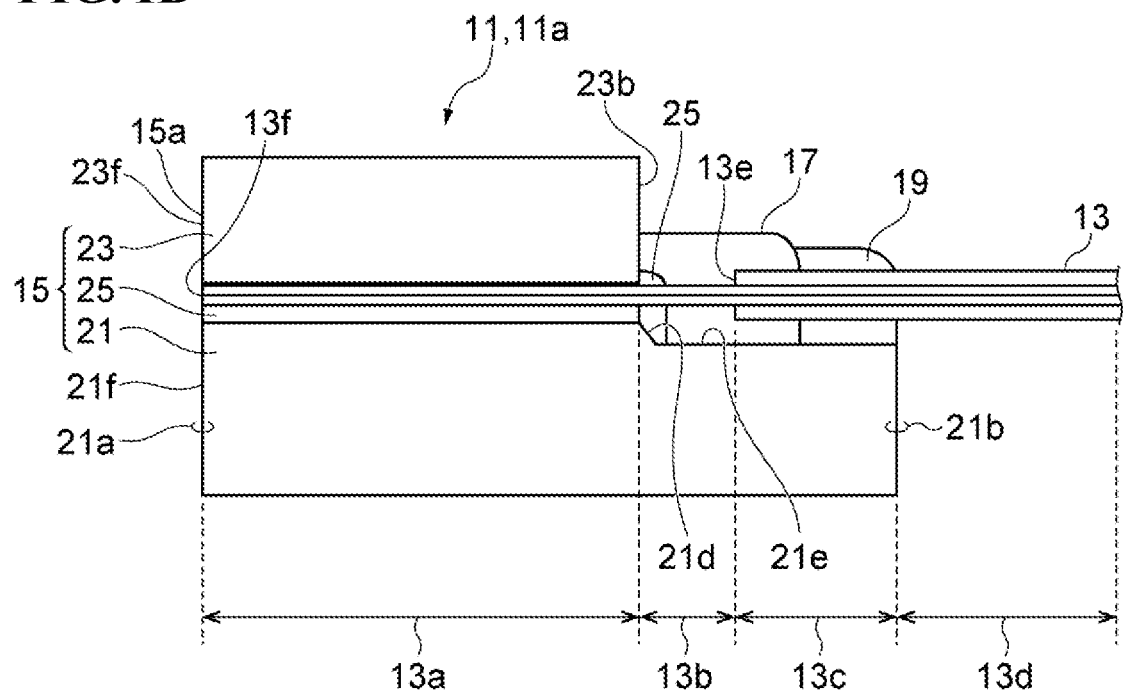
FIG. 1B is a sectional view taken along line Ib-Ib in FIG. 1A.
Figure 3A:
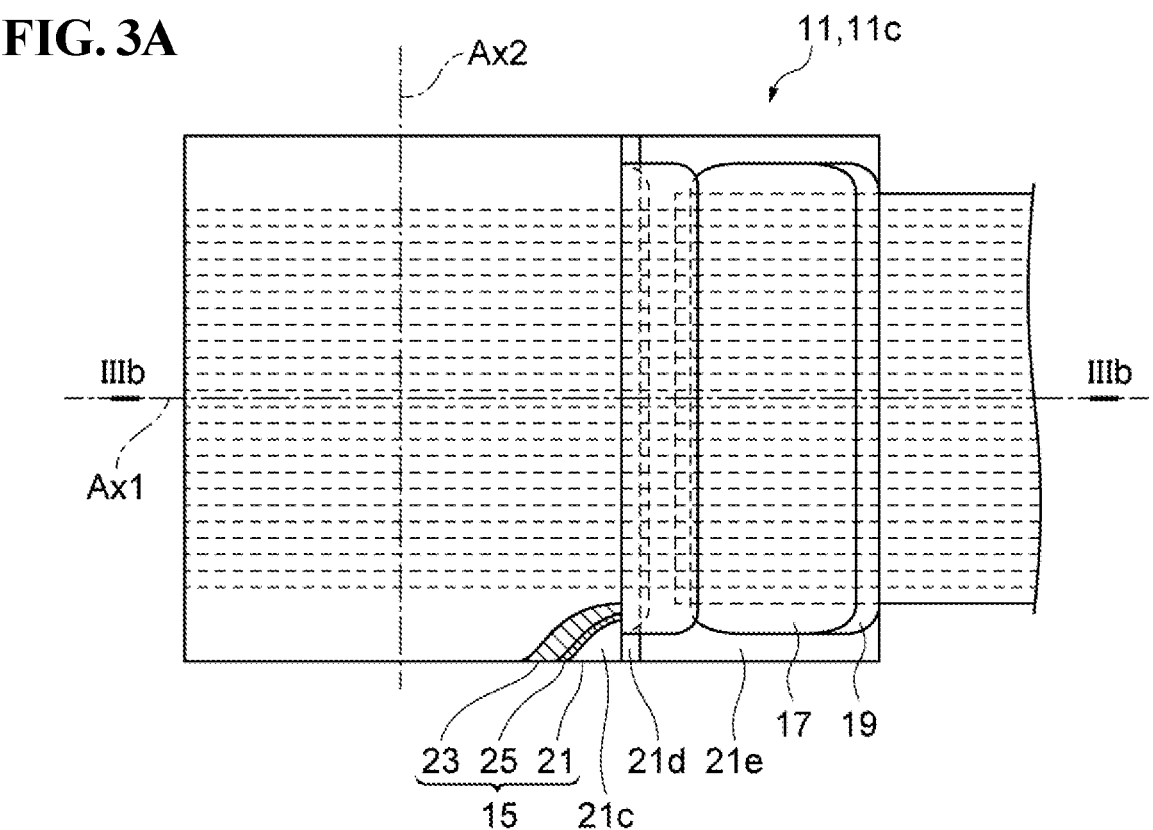
FIG. 3A is a plan view of the optical coupling device according to the embodiment.
Figure 3B:
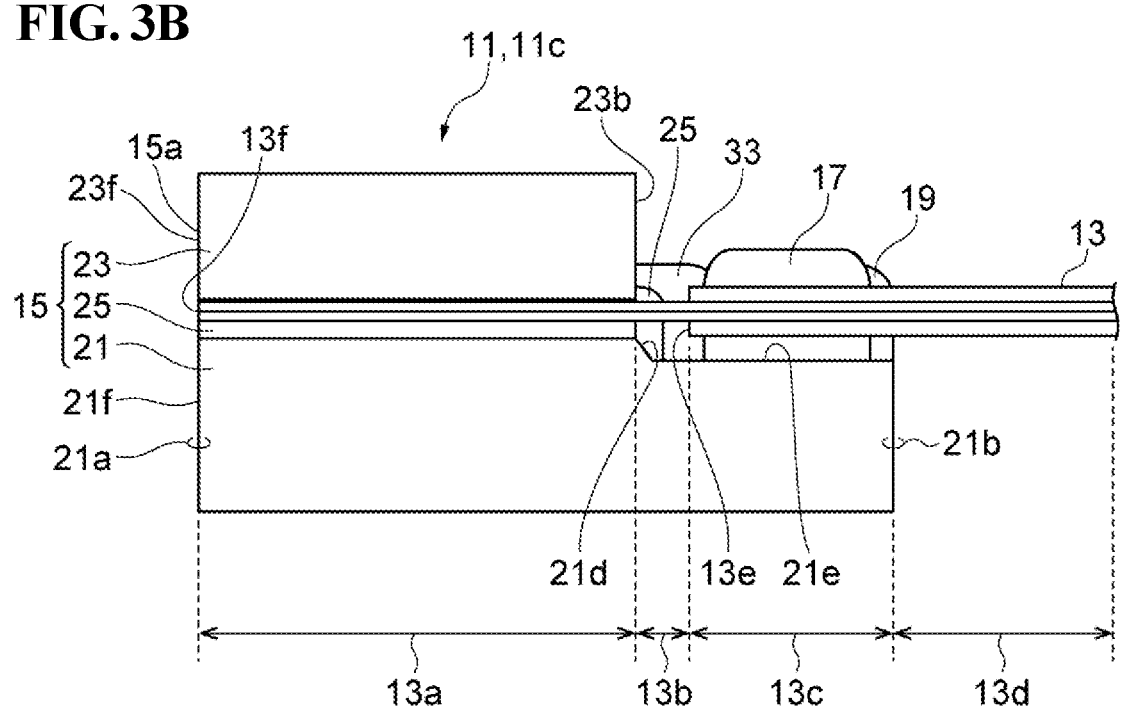
FIG. 3B is a sectional view taken along line IIIb-IIIb in FIG. 3A.
Figure 4A:
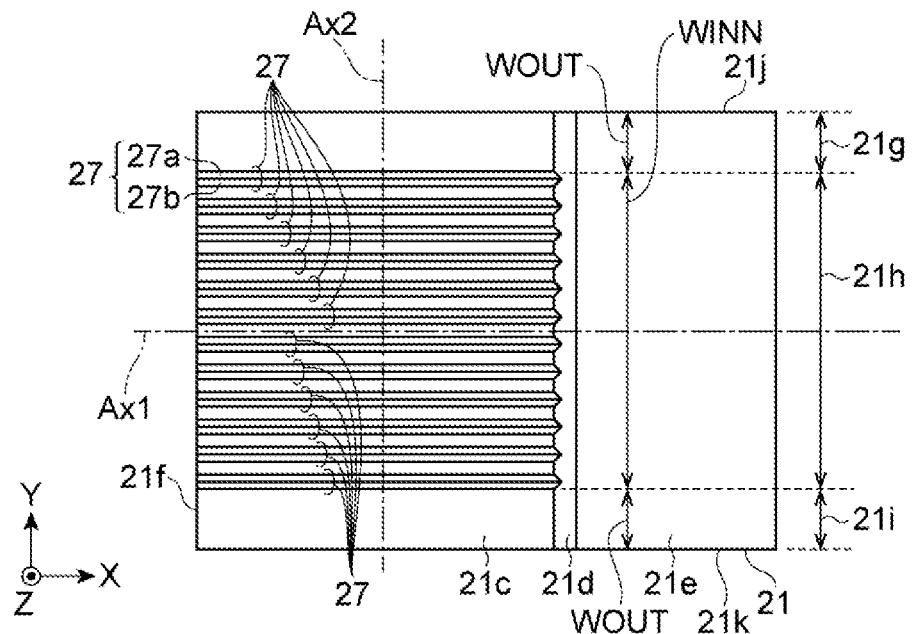
FIG. 4A is a plan view of a first component of the optical coupling device according to the embodiment.
Figure 4B:
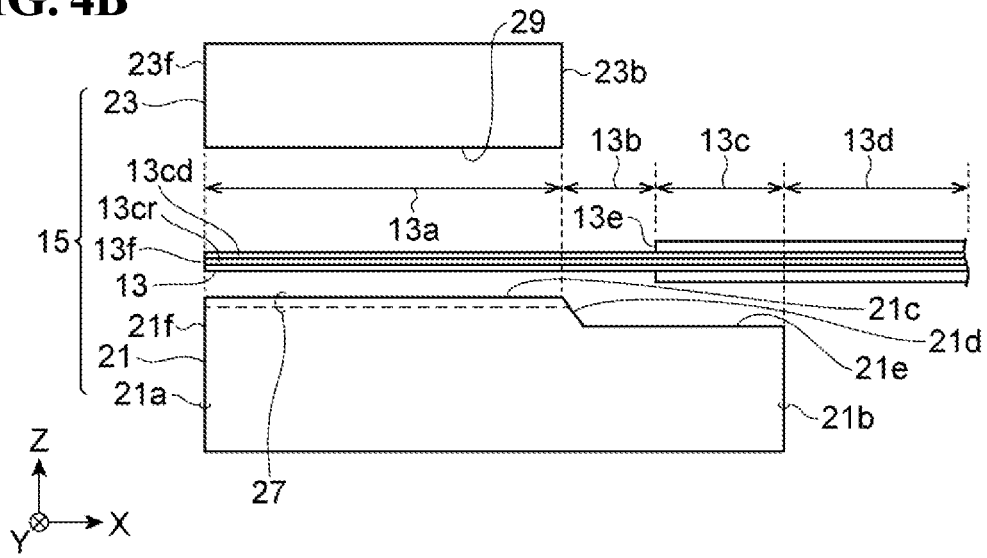
FIG. 4B is an exploded view of the first component, a second component, and optical fibers of the optical coupling device according to the embodiment.
Figure 4C:
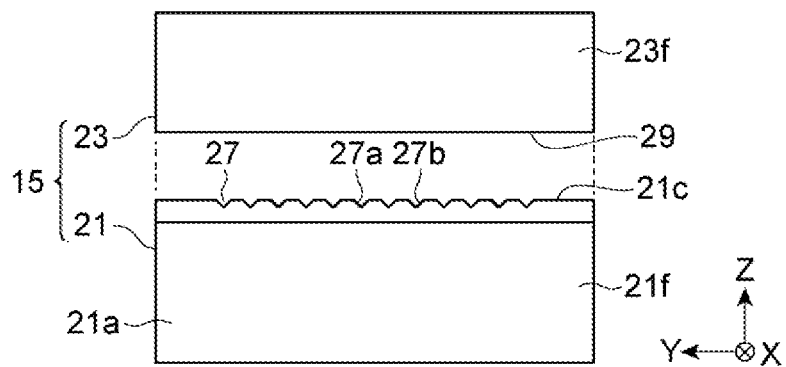
FIG. 4C is a front view of the first component and the second component of the optical coupling device according to the embodiment.

FIG. 1A is a plan view of an optical coupling device 11 (11a) according to the embodiment. FIG. 1B is a sectional view taken along line Ib-Ib in FIG. 1A. FIG. 2A is a plan view of the optical coupling device 11 (11b) according to the embodiment. FIG. 2B is a sectional view taken along line IIb-IIb in FIG. 2A. FIG. 3A is a plan view of the optical coupling device 11 (11c) according to the embodiment. FIG. 3B is a sectional view taken along line IIIb-IIIb in FIG. 3A. FIG. 4A illustrates a first component of the optical coupling device according to the embodiment. FIG. 4B illustrates the first component, a second component, and optical fibers of the optical coupling device according to the embodiment. FIG. 4C is a front view of the first component and the second component of the optical coupling device according to the embodiment.

The optical coupling device 11 (11a, 11b, 11c) includes one or more optical fibers 13, a holder 15, a first resin body 17, and a second resin body 19. The holder 15 includes a first component 21, a second component 23, and an adhesive resin body 25.

The first component 21 of the holder 15 has a front end 21a, a rear end 21b, a first surface 21c, a step 21d, and a second surface 21e. The first surface 21c, the step 21d, and the second surface 21e are arranged in a first direction from the front end 21a toward the rear end 21b (e.g., in the direction of a first axis Ax1).

The second component 23 of the holder 15 is disposed on the first surface 21c of the first component 21 and is separated from the second surface 21e of the first component 21.

The adhesive resin body 25 of the holder 15 is disposed between the first surface 21c of the first component 21 and the second component 23 and secures the first component 21, the second component 23, and the optical fibers 13 to each other.

The first resin body 17 is in contact with the optical fibers 13 and the first component 21. The second resin body 19 covers the optical fibers 13 over the second surface 21e along the rear end 21b of the first component 21 and is in contact with the optical fibers 13 and the second surface 21e of the first component 21. The first resin body 17 and the second resin body 19 secure the optical fibers 13 to the second surface 21e of the first component 21. The first resin body 17 is disposed between the second resin body 19 and the adhesive resin body 25. The second resin body 19 has a lower Young's modulus than the first resin body 17 and can also have a lower Young's modulus than the adhesive resin body 25.

As shown in FIGS. 4A, 4B, and 4C, each optical fiber 13 includes a first bared optical fiber portion 13a, a second bared optical fiber portion 13b, a first coated optical fiber portion 13c, and a second coated optical fiber portion 13d. The first bared optical fiber portion 13a, the second bared optical fiber portion 13b, the first coated optical fiber portion 13c, and the second coated optical fiber portion 13d are arranged in sequence in the direction of a waveguide axis. In the optical coupling device 11, the waveguide axes are parallel with the first axis AX1. The first coated optical fiber portion 13c and the second coated optical fiber portion 13d are resin-coated and have a coating end 13e at the boundary between the second bared optical fiber portion 13b and the first coated optical fiber portion 13c. The first bared optical fiber portion 13a and the second bared optical fiber portion 13b are exposed from the coating resin. Each optical fiber 13 includes, for example, a single-mode silica glass fiber. Each optical fiber 13 includes a core 13cr and a cladding 13cd.

Referring to FIGS. 1A to 3B, specifically, the second component 23 is disposed on the first surface 21c of the first component 21. The second resin body 19 extends along the rear end 21b of the first component 21 and covers the first coated optical fiber portions 13c. The second coated optical fiber portions 13d extend out of the holder 15.

In the optical coupling device 11 (11a, 11b, 11c), the first resin body 17, which has a higher Young's modulus, is in contact with the first coated optical fiber portions 13c and the first component 21. The first resin body 17 can thus secure the optical fibers 13 to the first component 21 so as to resist the force component, in the direction of the waveguide axis, of force applied from the second coated optical fiber portions 13d to the first coated optical fiber portions 13c. The second resin body 19, which has a lower Young's modulus, extends along the rear end 21b of the first component 21 so as to cover the first coated optical fiber portions 13c. The second resin body 19 can thus secure the optical fibers 13 to the first component 21 so as to resist the force component in a direction crossing the waveguide axis. In addition, the second resin body 19 has less tendency to transmit the deformation (e.g., thermal deformation) of the first component 21 to the optical fibers 13.

The first component 21 contains, for example, a glass such as silica glass, Tempax (registered trademark), or Pyrex (registered trademark), or a ceramic such as alumina or zirconia. The second component 23 contains, for example, a glass such as silica glass, Tempax (registered trademark), or Pyrex (registered trademark), or a ceramic such as alumina or zirconia.

The adhesive resin body 25 secures the first bared optical fiber portions 13a to the first component 21 and the second component 23. The adhesive resin body 25 is disposed between the first component 21 and the second component 23. If necessary, the adhesive resin body 25 can be disposed between the first surface 21c and the second component 23 and between the step 21d and the second component 23. Specifically, the adhesive resin body 25 protrudes slightly from between the first surface 21c of the first component 21 and the second component 23 so that the adhesive spreads between the first surface 21c of the first component 21 and the second component 23 in the direction of the first axis Ax1. The adhesive resin body 25 is, for example, epoxy-based, acrylate-based, or silicone-based. The adhesive resin body 25 has a Young's modulus of, for example, $1 \times 10^{10}$ dyn/cm$^2$.

The first resin body 17 is disposed between the second resin body 19 and the adhesive resin body 25. The first resin body 17 covers the first coated optical fiber portions 13c and is in contact with the first component 21. The first resin body 17 is, for example, epoxy-based, acrylate-based, or silicone-based. The first resin body 17 has a Young's modulus of, for example, $1 \times 10^{10}$ dyn/cm$^2$.

The second resin body 19 extends over the second surface 21e along the rear end 21b of the first component 21 so as to cover the first coated optical fiber portions 13c and secures the first coated optical fiber portions 13c to the second surface 21e of the first component 21. The second resin body 19 is, for example, epoxy-based, acrylate-based, or silicone-based. The second resin body 19 has a Young's modulus of, for example, $1 \times 10^{8}$ dyn/cm$^2$.

The first resin body 17 has a higher Young's modulus than the second resin body 19. The second resin body 19 can have a lower Young's modulus than the adhesive resin body 25.

The optical fibers 13, specifically, the first bared optical fiber portions 13a, each have a leading end 13f located at the front end 21a of the first component 21 (the front end of the holder 15). The second bared optical fiber portions 13b extend out of the holder 15.

The first coated optical fiber portions 13c of the optical fibers 13 are separated from the second surface 21e of the first component 21. The second bared optical fiber portions 13b are also separated from the second surface 21e of the first component 21. The first coated optical fiber portions 13c can be separated from the second surface 21e of the first component 21 by a distance of, for example, 0.01 to 0.1 mm. To allow such separation, resin bodies such as the first resin body 17 and the second resin body 19 (resin bodies on the second surface 21e) hold the second bared optical fiber portions 13b and the first coated optical fiber portions 13c.

This separation results in less stress in the second bared optical fiber portions 13b and the first coated optical fiber portions 13c of the optical fibers 13 due to the deformation of the first component 21 (e.g., thermal deformation that occurs when the temperature of the optical coupling device 11 changes).

Referring to FIGS. 4A, 4B, and 4C, one of the first component 21 and the second component 23, i.e., the first component 21 in this example, has support grooves 27 for supporting the optical fibers 13 in the first surface 21c. The support grooves 27 each include, for example, a first support surface 27a and a second support surface 27b. For example, the support grooves 27 can be V-grooves. The step 21d terminates the support grooves 27, and the second surface 21e is substantially flat. The step 21d can have an inclined surface joining the first surface 21c to the second surface 21e. The other of the first component 21 and the second component 23, i.e., the second component 23 in this example, has a substantially flat support surface 29.

The first component 21 includes a first outer portion 21g, an inner portion 21h, and a second outer portion 21i. The first outer portion 21g, the inner portion 21h, and the second outer portion 21i extend in the direction of the first axis Ax1 and are arranged in the direction of a second axis Ax2 crossing the first axis Ax1. The second surface 21e and the step 21d extend from one side 21j to the other side 21k of the first component 21 across the first outer portion 21g, the inner portion 21h, and the second outer portion 21i. The first surface 21c is flat in the first outer portion 21g and the second outer portion 21i and has the support grooves 27 in the inner portion 21h. Preferably, the second component 23 does not overlie the second surface 21e over the inner portion 21h of the first component 21 and leaves the entire step 21d uncovered. The support surface 29 of the second component 23 terminates over the first surface 21c or the step 21d.

Referring to FIGS. 1A to 3B, all resin bodies securing the optical fibers 13 to the second surface 21e, including the first resin body 17 and the second resin body 19, extend from the first outer portion 21g through the inner portion 21h to the second outer portion 21i. In the second surface 21e, the first outer portion 21g and the second outer portion 21i can each have a width WOUT of, for example, 0.3 to 3 mm. The inner portion 21h has a width WINN of, for example, 0.3 to 3 mm, which is associated with the number of optical fibers.

In the optical coupling device 11 (11a, 11b, 11c), an optical coupling end surface 15a of the holder 15 includes a substantially flat surface. The optical coupling end surface 15a includes a leading end surface 21f of the first component 21 and a leading end surface 23f of the second component 23. The leading end surface 21f of the first component 21, the leading end surface 23f of the second component 23, and the leading ends 13f of the optical fibers 13 are arranged in the optical coupling end surface 15a. The optical coupling device 11 (11a, 11b, 11c) allows optical coupling through the leading ends 13f of the optical fibers 13 arranged in line between the leading end surface 21f of the first component 21 and the leading end surface 23f of the second component 23. The holder 15 shown in FIGS. 1A to 4C is merely illustrative; the shape of the optical coupling device 11 is not limited to any particular optical coupling end surface 15a.

Referring to FIGS. 1A and 1B, the first resin body 17 of the optical coupling device 11 (11a) is in contact with the second bared optical fiber portions 13b, the adhesive resin body 25, and the second resin body 19. In addition, the first resin body 17 covers the adhesive resin body 25 and is in contact with a rear end surface 23b of the second component 23. The first resin body 17 extends along the boundaries between the second bared optical fiber portions 13b and the first coated optical fiber portions 13c.

In the optical coupling device 11 (11a), the first resin body 17 extends over the second bared optical fiber portions 13b and the first coated optical fiber portions 13c in a second direction (in the direction of the second axis Ax2) so that the coating ends 13e located at the boundaries between the second bared optical fiber portions 13b and the first coated optical fiber portions 13c are covered with a single resin. The coating ends 13e are covered by the first resin body 17, which is different from the resin body that is directly subjected to force from the second coated optical fiber portions 13d, i.e., the second resin body 19. The first resin body 17, which has a higher Young's modulus, extends over the optical fibers 13 and the first component 21 in the second direction at a distance from the rear end 21b of the first component 21 and secures the optical fibers 13 to the first component 21. The first resin body 17 is in contact with the adhesive resin body 25 and the second component 23 and resists the force component in the direction of the waveguide axis.

In this example, the adhesive resin body 25 protrudes from between the first component 21 and the second component 23 to such an extent as to partially or completely covers the step 21d of the first component 21. The adhesive resin body 25 restricts the bending of the second bared optical fiber portions 13b over the step 21d.

The first resin body 17 surrounds the side surface of each second bared optical fiber portion 13b around the waveguide axis. The first resin body 17 is thicker than the adhesive resin body 25. Such a thick resin body can reliably cover the top surface of the adhesive resin body 25. Although externally exposed second bared optical fiber portions 13b would be readily damaged when exposed to direct impact, covering the second bared optical fiber portions 13b with the first resin body 17 improves their strength against impact. The first resin body 17 is preferably wider than the adhesive resin body 25 over the second surface 21e. Such a wide resin body can reliably cover the side surface of the adhesive resin body 25. Reliably covering the side surface of the adhesive resin body 25 with the first resin body 17 increases the adhesion strength between the first resin body 17 and the adhesive resin body 25 and thus allows the optical fibers 13 to be robustly secured so as to resist the force component in the direction of the waveguide axis.

The second resin body 19 surrounds the resin side surface of all first coated optical fiber portions 13c along the side surface of the coating resin body of the first coated optical fiber portions 13c. When force acts on the first coated optical fiber portions 13c in a direction orthogonal to the longitudinal direction, the second resin body 19, which has a lower Young's modulus, deforms and absorbs the force, thereby preventing the optical fibers 13 from being damaged. When force acts on the first coated optical fiber portions 13c in the longitudinal direction, the first resin body 17, which has a higher Young's modulus, prevents the optical fibers 13 from being displaced relative to the holder 15 in the longitudinal direction.

The first resin body 17 is made thick without causing it to leak outside the second surface 21e. Such a thick resin body robustly bonds together the optical fibers 13 and the holder 15 and resists force in the longitudinal direction. The second resin body 19 is thinner than the first resin body 17 but is thicker than the protruding portion of the adhesive resin body 25. Such a thick resin body can reliably cover the top surface of the adhesive resin body 25.

The optical coupling device 11 (11a), in which the coating ends 13e are covered by the first resin body 17 located between the second component 23 and the second resin body 19, has a loose tolerance for the alignment of the optical fibers 13, specifically, the alignment of the coating ends 13e.

Referring to FIGS. 2A to 3B, the optical coupling device 11 (11b, 11c) further includes a third resin body 33. The third resin body 33 covers the coating ends 13e at the boundaries between the second bared optical fiber portions 13b and the first coated optical fiber portions 13c. The third resin body 33 is disposed between the adhesive resin body 25 and the first and second resin bodies 17 and 19.

In the optical coupling device 11 (11b, 11c), the first resin body 17, which has a higher Young's modulus, is in contact with the first coated optical fiber portions 13c and the first component 21 and secures the optical fibers 13 to the first component 21 so as to resist the force component applied in the direction of the waveguide axis. The third resin body 33 covers the boundaries between the second bared optical fiber portions 13b and the first coated optical fiber portions 13c. The third resin body 33 thus prevents the first resin body 17 and the second resin body 19, which resist external force, from being in contact with the optical fiber boundaries and the second bared optical fiber portions 13b. The coating ends 13e are covered by the third resin body 33, which is different from the resin bodies that resist force from the second coated optical fiber portions 13d, i.e., the first resin body 17 and the second resin body 19.

The third resin body 33 surrounds the side surface of each second bared optical fiber portion 13b around the waveguide axis. The third resin body 33 is thicker than the adhesive resin body 25. Such a thick resin body can reliably cover the top surface of the adhesive resin body 25. Although externally exposed second bared optical fiber portions 13b would be readily damaged when exposed to direct impact, covering the second bared optical fiber portions 13b with the third resin body 33 improves their strength against impact. The third resin body 33 is preferably wider than the adhesive resin body 25 over the second surface 21e. Such a wide resin body can reliably cover the side surface of the adhesive resin body 25. Reliably covering the side surface of the adhesive resin body 25 with the third resin body 33 increases the adhesion strength between the third resin body 33 and the adhesive resin body 25 and thus allows the optical fibers 13 to be robustly secured so as to resist the force component in the direction of the waveguide axis together with the first resin body 17.

In the optical coupling device 11 (11b, 11c), the coating ends 13e are positioned closer to the second component 23. The first coated optical fiber portions 13c are longer than the second bared optical fiber portions 13b over the second surface 21e. The coating ends 13e are closer to the rear end surface 23b of the second component 23 than to the rear end 21b. Since the coating ends 13e are closer to the second component 23, the third resin body 33, which extends along the rear end surface 23b of the second component 23, readily covers both the second bared optical fiber portions 13b and the coating ends 13e.

Referring to FIGS. 2A and 2B, the first resin body 17 of the optical coupling device 11 (11b) covers the third resin body 33, and the third resin body 33 separates the second bared optical fiber portions 13b and the coating ends 13e from the first resin body 17. Covering the third resin body 33 with the first resin body 17 increases the adhesion strength between the third resin body 33 and the first resin body 17 and thus allows the optical fibers 13 to be robustly secured so as to resist the force component in the direction of the waveguide axis.

The third resin body 33 has a lower Young's modulus than the first resin body 17. When force is externally applied, the third resin body 33, which has a lower Young's modulus, deforms, thereby preventing the force from being transmitted to the second bared optical fiber portions 13b. In addition, the third resin body 33 covers the coating ends 13e of the optical fibers 13 and thus firmly secures the coating ends 13e and the optical fiber portions on the front and rear sides thereof to the second component 23.

The third resin body 33 covers the adhesive resin body 25. Reliably covering the side surface of the adhesive resin body 25 with the third resin body 33 increases the adhesion strength between the third resin body 33 and the adhesive resin body 25 and thus allows the optical fibers 13 to be robustly secured so as to resist the force component in the direction of the waveguide axis. The first resin body 17 and the third resin body 33 are in contact with the second component 23. This increases the adhesion strength between the first resin body 17 and the second component 23 and the adhesion strength between the adhesive resin body 25 and the second component 23 and thus allows the optical fibers 13 to be robustly secured so as to resist the force component in the direction of the waveguide axis.

In the optical coupling device 11 (11b), the third resin body 33 separates the first resin body 17 and the second resin body 19 from the coating ends 13e at the boundaries between the second bared optical fiber portions 13b and the first coated optical fiber portions 13c. The third resin body 33 thus prevents the first resin body 17, which resists external force, from being in contact with the coating ends 13e and the second bared optical fiber portions 13b.

In the optical coupling device 11 (11b), the third resin body 33 has a higher Young's modulus than the second resin body 19. The third resin body 33, which has a higher Young's modulus, is in contact with the second component 23 and can thus secure the second bared optical fiber portion 13b and the coating ends 13e to the second component 23. In addition, the third resin body 33 can secure the coating ends 13e and the fiber portions on the front and rear sides thereof to the first component 21. By this securing, the third resin body 33 resists the force component in the direction of the waveguide axis together with the first resin body 17.

Referring to FIGS. 3A and 3B, the third resin body 33 of the optical coupling device 11 (11c) separates the first resin body 17 from the second component 23. The first resin body 17 is separated from the coating ends 13e and the second component 23.

The third resin body 33 covers the adhesive resin body 25. Covering the adhesive resin body 25 with the third resin body 33 increases the adhesion strength between the third resin body 33 and the adhesive resin body 25 and thus allows the optical fibers 13 to be robustly secured so as to resist the force component in the direction of the waveguide axis together with the first resin body 17. In addition, the third resin body 33 separates the second component 23 and the adhesive resin body 25 from the first resin body 17. When external force is applied to the first resin body 17, the third resin body 33 prevents the force from being transmitted to the second component 23 and the adhesive resin body 25. The third resin body 33 is in contact with the second component 23. This increases the adhesion strength between the third resin body 33 and the second component 23 and thus allows the optical fibers 13 to be robustly secured so as to resist the force component in the direction of the waveguide axis.

The third resin body 33 has a lower Young's modulus than the first resin body 17. The third resin body 33, which has a lower Young's modulus, can reduce the stress applied to the optical fibers 13 when the optical coupling device 11 (11c) is used at low temperature.

In the optical coupling device 11 (11c), the third resin body 33 separates the first resin body 17 from the coating ends 13e at the boundaries between the second bared optical fiber portions 13b and the first coated optical fiber portions 13c. The third resin body 33 can thus prevent the first resin body 17 and the second resin body 19, which resist external force, from being in contact with the coating ends 13e and the second bared optical fiber portions 13b. In addition, the third resin body 33 can firmly secure the coating ends 13e and the fiber portions on the front and rear sides thereof to the first component 21. The third resin body 33 has a lower Young's modulus than the first resin body 17. When force acts externally toward the coating ends 13e, the third resin body 33 deforms and absorbs the force, thereby preventing the optical fibers 13 from being damaged.

In the optical coupling device 11 (11c), the third resin body 33 is in contact with the second component 23 and can thus secure the second bared optical fiber portions 13b and the optical fiber boundaries to the second component 23. In addition, the third resin body 33 has less tendency to transmit the deformation of the first component 21 and the second component 23 to the optical fibers 13.

Figure 5A:
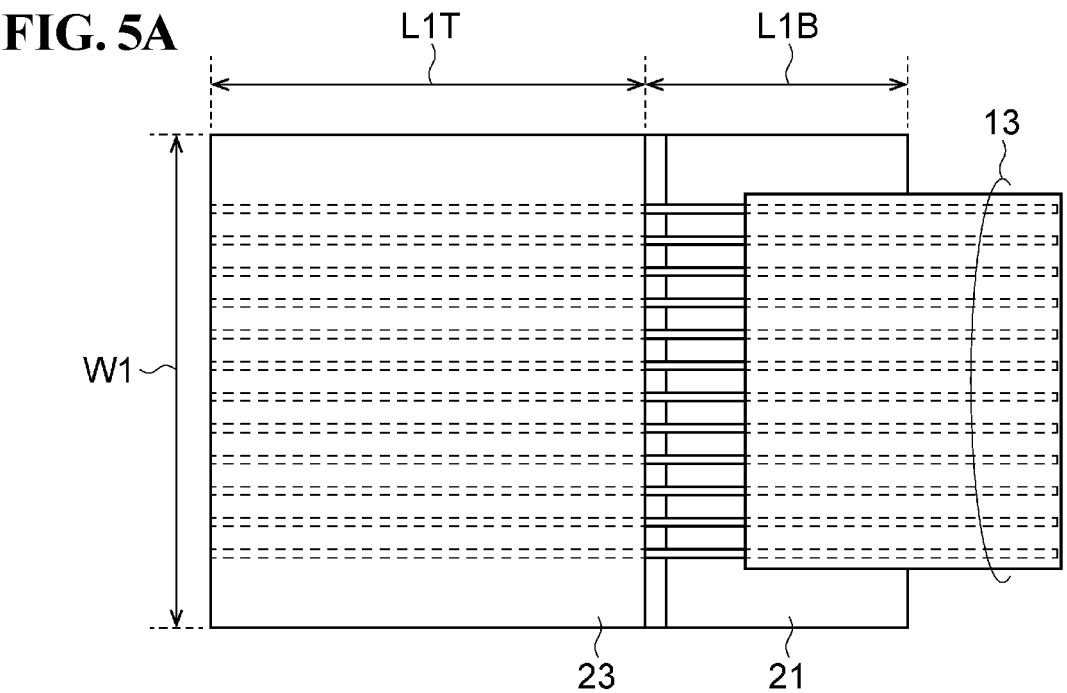
FIG. 5A illustrates the first component and the second component of the optical coupling device according to the embodiment.
Figure 5B:
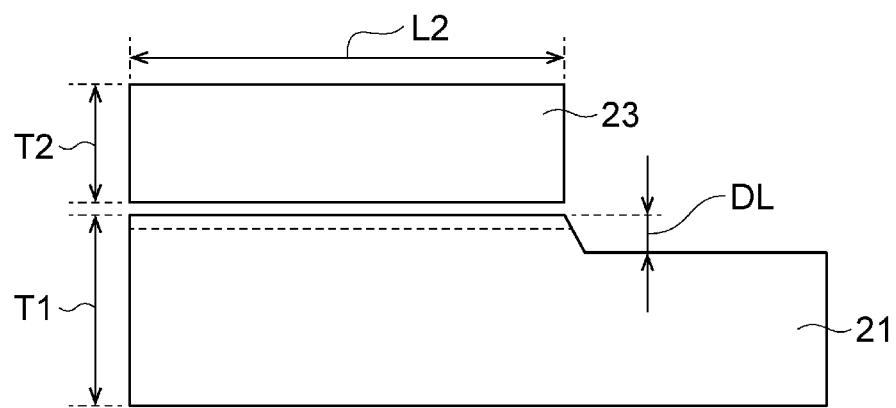
FIG. 5B illustrates the first component and the second component of the optical coupling device according to the embodiment.

FIGS. 5A and 5B illustrate the first component and the second component of the optical coupling device according to the embodiment.

Typical dimensions of the optical coupling device are shown below:

Width W1 of first component 21: 2 to 8 mm, for example, 4 mm

Total length L1T of first component 21: 2 to 10 mm, for example, 5 mm

Length L1B of second surface 21e of first component 21: 0.3 to 3 mm, for example, 1 mm Depth DL of step 21d of first component 21: 0.2 to 1 mm, for example, 0.3 mm Width W2 of second component 23: 2 to 8 mm, for example, 4 mm Length L2 of second component 23: 1.7 to 7 mm, for example, 5 mm Thickness of resin bodies on second surface 21e: 0.3 to 1 mm, for example, 0.5 mm The main steps of a method for producing the optical coupling device according to the embodiment will now be described with reference to FIGS. 6A to 17B.

Figure 6A:
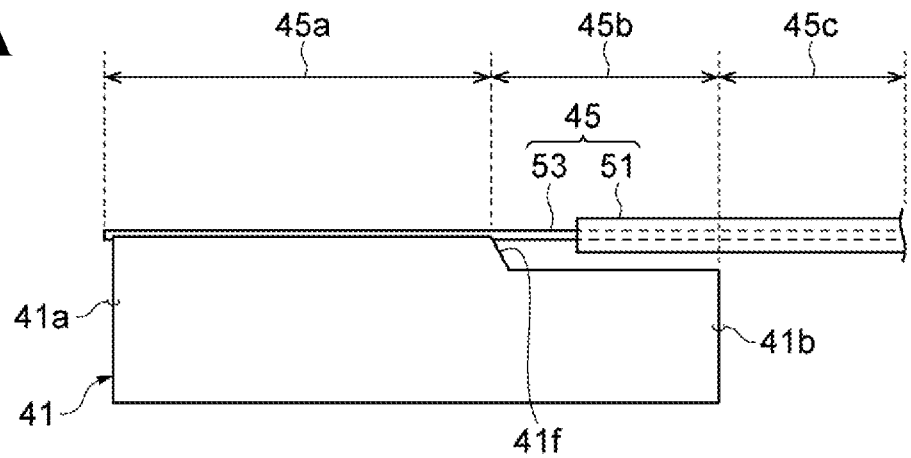
FIG. 6A schematically illustrates the main steps of a method for producing the optical coupling device according to the embodiment.
Figure 6B:
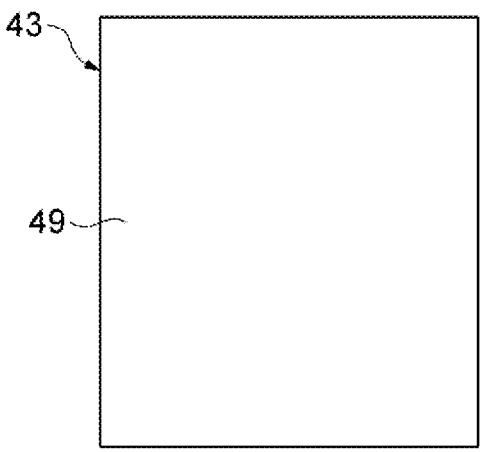
FIG. 6B schematically illustrates the main steps of the method for producing the optical coupling device according to the embodiment.
Figure 6C:
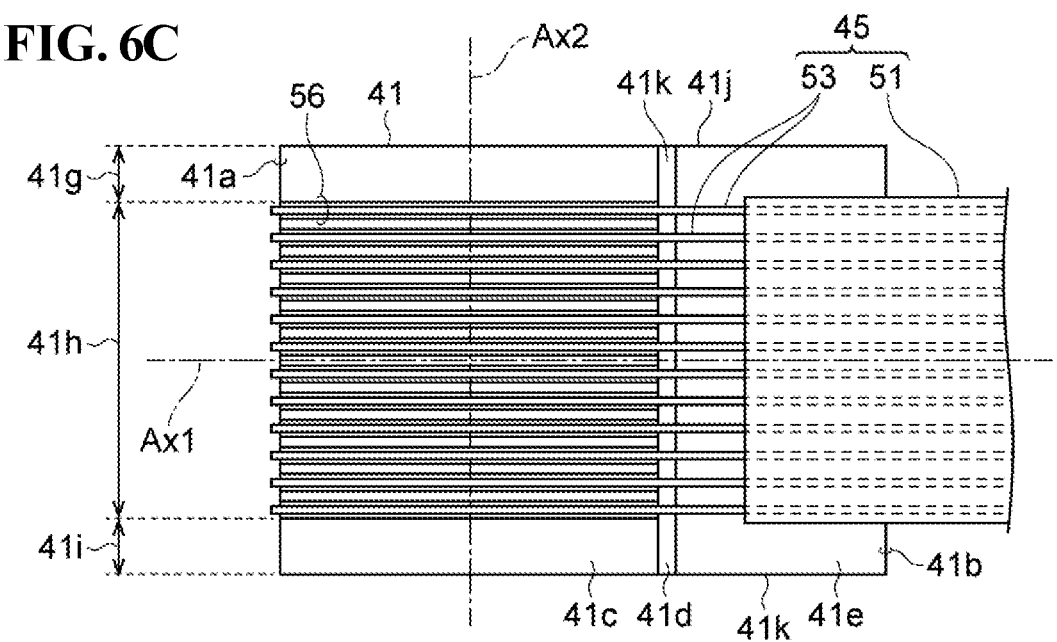
FIG. 6C schematically illustrates the main steps of the method for producing the optical coupling device according to the embodiment.

As shown in FIGS. 6A, 6B, and 6C, in the first step, a first member 41, a second member 43, and an optical fiber component 45 are provided.

The optical fiber component 45 includes a coating resin body 51 and a plurality of optical fibers 53. Each optical fiber 53 includes a first portion 45a, a second portion 45b, and a third portion 45c that are arranged in sequence in the direction of the waveguide axis.

The first member 41 has a first end 41a and a second end 41b and has a first surface 41c, a step 41d, and a second surface 41e. The first surface 41c, the step 41d, and the second surface 41e are arranged in the direction of a first axis Ax1 from the first end 41a toward the second end 41b.

One of the first member 41 and the second member 43 has support grooves 56, whereas the other of the first member 41 and the second member 43 has a substantially flat support surface 49. The support grooves 56 are in contact with the optical fiber component 45 and support the optical fiber component 45.

In this example, the first member 41 and the second member 43 have the support grooves 56 and the support surface 49, respectively. The support grooves 56 are defined in the first surface 41c of the first member 41. For example, the support grooves 56 can be V-grooves. The step 41d terminates the support grooves 56. The first member 41 can have an inclined surface 41f joining the first surface 41c to the second surface 41e. The second surface 41e is substantially flat.

The first member 41 includes a first outer portion 41g, an inner portion 41h, and a second outer portion 41i. The first outer portion 41g, the inner portion 41h, and the second outer portion 41i extend in the direction of the first axis Ax1 and are arranged in the direction of a second axis Ax2 crossing the first axis Ax1.

The second surface 41e and the step 41d extend from one side 41j to the other side 41k of the first member 41 across the first outer portion 41g, the inner portion 41h, and the second outer portion 41i. The first surface 41c is flat in the first outer portion 41g and the second outer portion 41i and has the support grooves 56 in the inner portion 41h.

The first outer portion 41g and the second outer portion 41i can each have a width of, for example, 0.3 to 3 mm. The inner portion 41h can have a width of, for example, 0.3 to 3 mm.

Figure 7A:
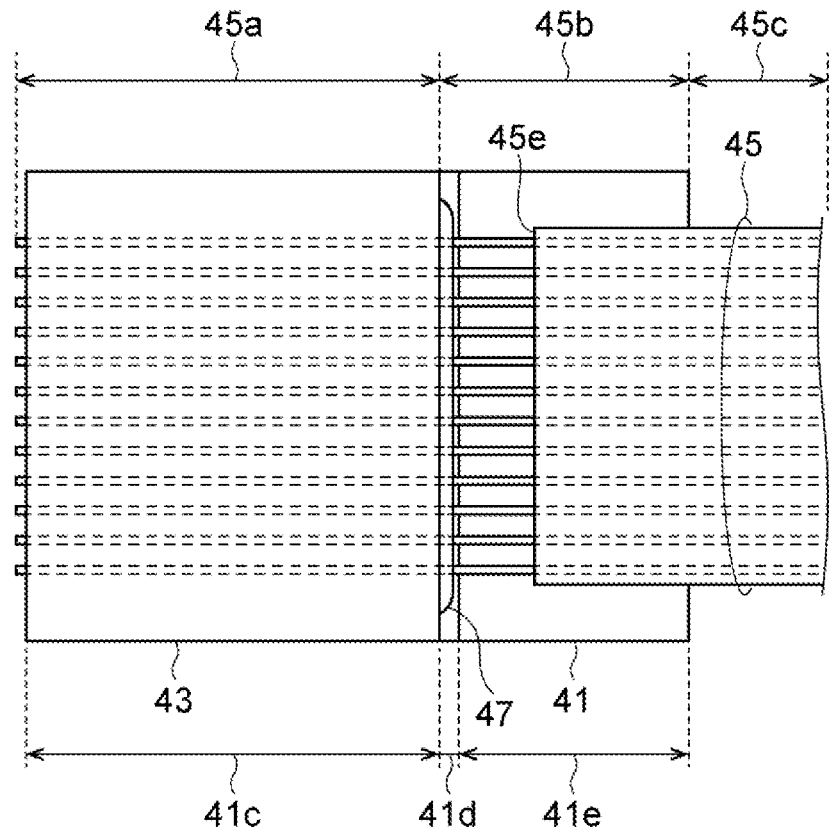
FIG. 7A schematically illustrates the main steps of the method for producing the optical coupling device according to the embodiment.

Referring to FIG. 7A, in the next step, an adhesive 47 for securing together the optical fiber component 45, the first member 41, and the second member 43 is applied to the optical fiber component 45, the first member 41, and the second member 43. The optical fiber component 45 is placed between the first member 41 and the second member 43. Specifically, the first portions 45a and the second portions 45b of the optical fiber component 45 are disposed over the first surface 41c and the second surface 41e, respectively, of the first member 41, whereas the third portions 45c lie outside the arrangement of the first member 41 and the second member 43.

Figure 7B:
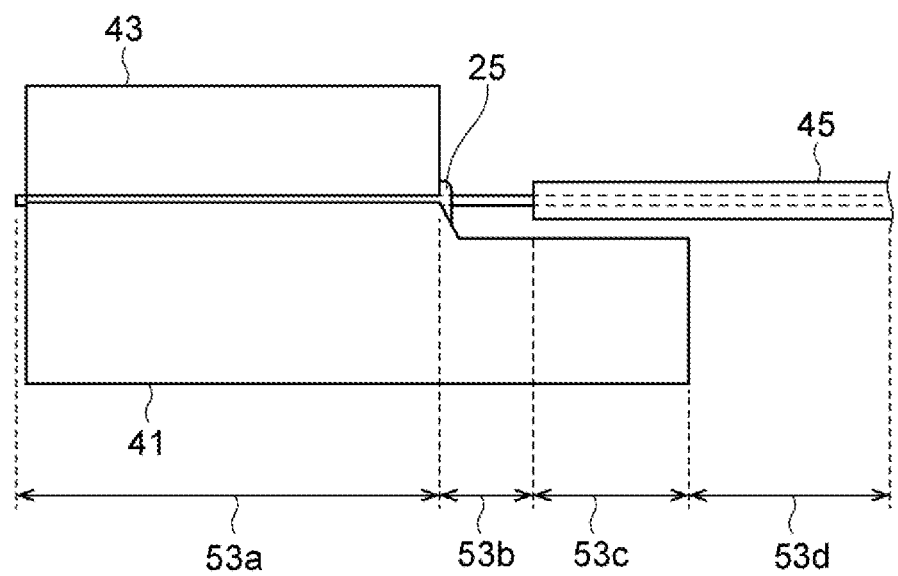
FIG. 7B schematically illustrates the main steps of the method for producing the optical coupling device according to the embodiment.

Referring to FIG. 7B, the adhesive 47 is solidified to bond the first portions 45a of the optical fiber component 45, the first member 41, and the second member 43 arranged as described above to each other. The adhesive 47 can contain, for example, an ultraviolet hardener and/or a thermal hardener. The adhesive 47 is solidified to form an adhesive resin body 25 securing together the arrangement of the optical fiber component 45, the first member 41, and the second member 43. The adhesive 47 has a low viscosity, i.e., 100 to 1,000 centipoises (cP), so that the adhesive 47 spreads readily throughout the support grooves 56.

The second member 43 does not overlie the second surface 41e over the inner portion 41h of the first member 41. The support surface 49 of the second member 43 terminates over the first surface 41c or the step 41d. Preferably, the second member 43 does not overlie the second surface 41e over the inner portion 41h of the first member 41 and leaves the entire step 41d uncovered.

Figure 8:
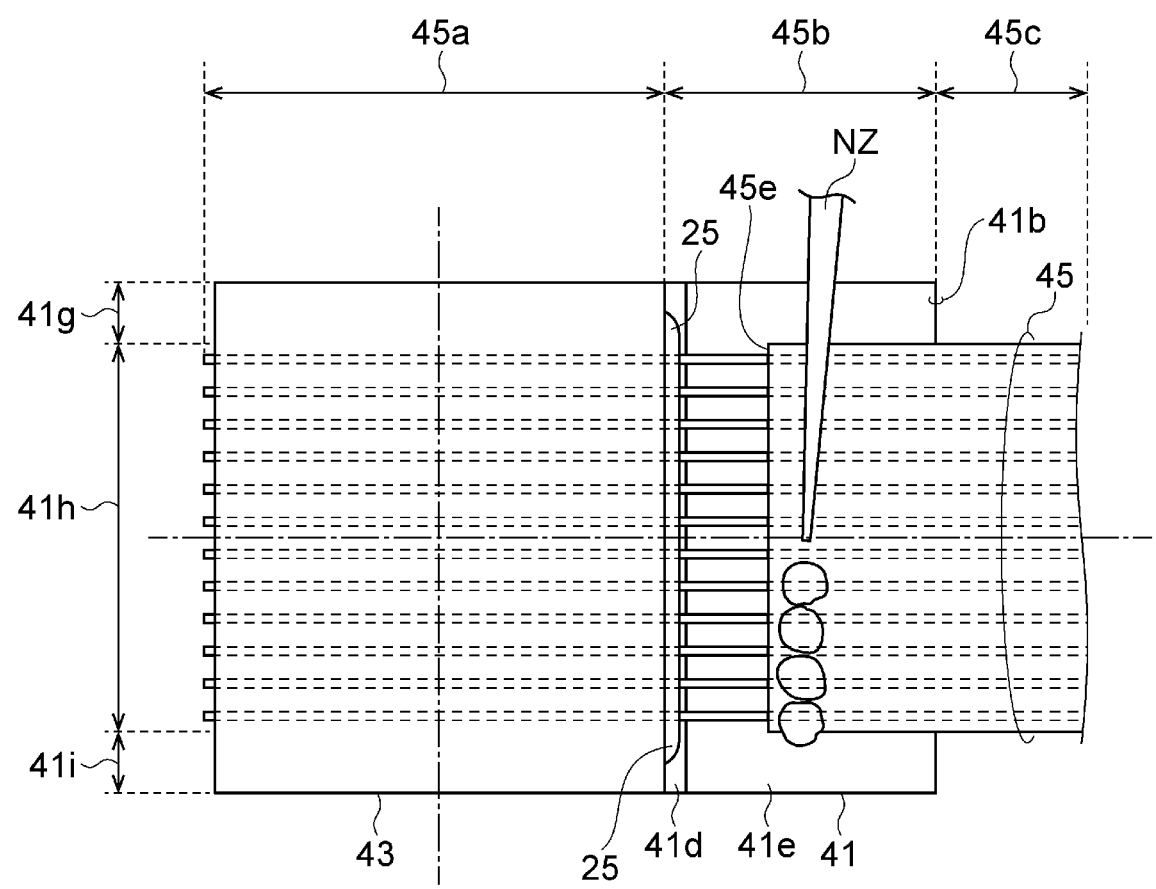
FIG. 8 schematically illustrates the main steps of the method for producing the optical coupling device according to the embodiment.

After the formation of the adhesive resin body 25, resins are repeatedly applied to and cured on the second surface 41e of the first member 41 and the second portions 45b of the optical fiber component 45. As shown in FIG. 8, in each coating operation, a resin is applied to the second surface 41e and the optical fiber component 45 by dispensing a plurality of droplets of the resin onto the second surface 41e using a nozzle NZ from one of the first outer portion 41g and the second outer portion 41i across the inner portion 41h to the other outer portion. The nozzle NZ is moved in the direction of the second axis Ax2. The applied resin can contain an ultraviolet hardener and/or a thermal hardener.

First, the first resin body 17 and the second resin body 19 are formed in sequence on the second surface 41e. The resins for bonding are characterized by their viscosities during application and their Young's moduli after solidification.

As for viscosity during application, a first adhesive 57 has a higher viscosity than the adhesive resin body 25. The viscosity is measured with an E-type viscometer. The first adhesive 57 can contain an ultraviolet hardener and/or a thermal hardener.

As for Young's modulus, the second resin body 19 has a lower Young's modulus than the first resin body 17. The second resin body 19 has a lower Young's modulus than the adhesive resin body 25.

Figure 9:
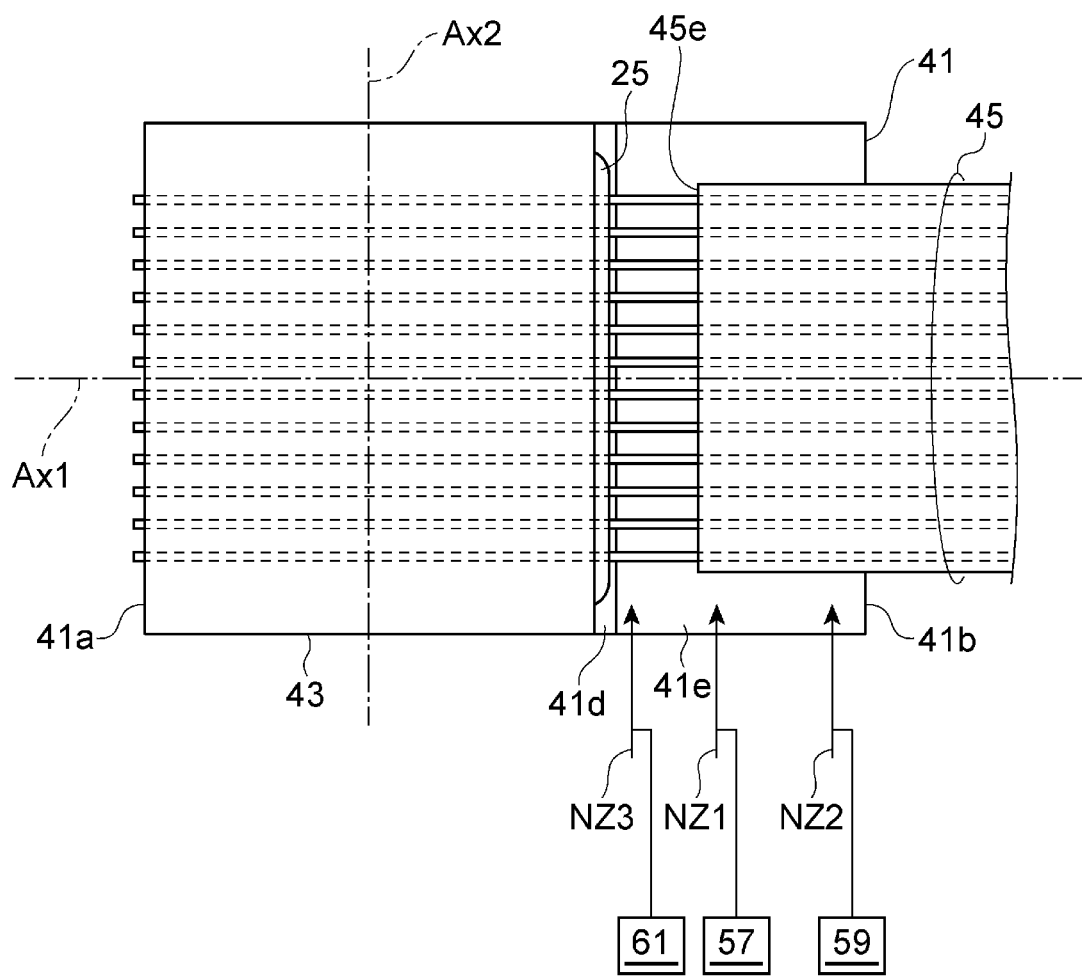
FIG. 9 schematically illustrates the main steps of the method for producing the optical coupling device according to the embodiment.

As shown in FIG. 9, after the formation of the adhesive resin body 25, the first adhesive 57 for the first resin body 17 is dispensed onto the optical fiber component 45 and the second surface 41e of the first member 41 at a distance from the second end 41b of the first member 41 such that the optical fiber component 45 is separated from the second surface 41e while a first nozzle NZ1 is being moved over the second surface 41e and the optical fiber component 45 across the optical fiber component 45 at a distance from the second end 41b of the first member 41. The thus-applied first adhesive 57 is solidified such that the optical fiber component 45 is separated from the second surface 41e. This separation prevents the optical fiber component 45 from coming into contact with the second surface 41e of the first member 41. The first adhesive 57 has a higher viscosity than the adhesive 47. A high viscosity facilitates retention of the shape of the applied adhesive.

After the formation of the first resin body 17, a second adhesive 59 for the second resin body 19 is dispensed onto the optical fiber component 45 and the second surface 41e along the second end 41b of the first member 41 such that the optical fiber component 45 is separated from the second surface 41e while a second nozzle NZ2 is being moved across the optical fiber component 45. The thus-applied second adhesive 59 is solidified such that the optical fiber component 45 is separated from the second surface 41e. The second resin body 19 holds the optical fiber component 45 over the second surface 41e. This separation prevents the optical fiber component 45 from coming into contact with the second end 41b of the first member 41. The second resin body 19 has a lower Young's modulus than the adhesive resin body 25 and the first resin body 17.

In the method for producing the optical coupling device, the first resin body 17, which has a higher Young's modulus, is in contact with the second portions 45b of the optical fiber component 45 and the first member 41 and secures the optical fiber component 45 to the first member 41. The first resin body 17 can thus resist the force component, in the direction of the waveguide axis, of force applied from the third portions 45c of the optical fiber component 45 to the second portions 45b of the optical fiber component 45. The second resin body 19, which has a lower Young's modulus, extends along the second end 41b so as to cover the second portions 45b of the optical fiber component 45 and secures the optical fiber component 45 to the first member 41. The second resin body 19 can thus resist the force component in a direction crossing the waveguide axis. In addition, the second resin body 19 has less tendency to transmit the deformation (e.g., thermal deformation) of the first member 41 to the optical fiber component 45. Since the optical fiber component 45 is separated from the first member 41 by the adhesives, the second portions 45b of the optical fiber component 45 are less susceptible to the deformation of the first member 41.

If necessary, another adhesive resin 61 can be dispensed onto the second surface 41e and the optical fiber component 45 before the application of the first adhesive 57 or after the formation of the first resin body 17 and the second resin body 19.

Specifically, a coating adhesive can be dispensed onto the second surface 41e and the optical fiber component 45 before the application of the first adhesive 57. The coating adhesive is applied across the optical fiber component 45. The coating adhesive is solidified such that the optical fiber component 45 is separated from the second surface 41e. Once solidified, the coating adhesive forms the third resin body 33.

Alternatively, a third adhesive can be dispensed onto the second surface 41e and the optical fiber component 45 after the formation of the first resin body 17 and the second resin body 19. The third adhesive is applied across the optical fiber component 45. The third adhesive is solidified such that the optical fiber component 45 is separated from the second surface 41e. Once solidified, the third adhesive forms the third resin body 33.

In either method of manufacture, the third resin body 33 extends over the boundaries between the bared optical fibers and the coated optical fibers in the direction of the second axis Ax2 so that coating ends 45e located at the boundaries can be covered with a single resin. The coating ends 45e are covered by the third resin body 33, which is different from the resin bodies that resist force from the second coated optical fibers 53d, i.e., the first resin body 17 and the second resin body 19. The third resin body 33, as well as the first resin body 17, can be disposed in contact with the second member 43 and can protect the bared optical fibers extending out of the second member 43.

In the method of manufacture without the use of the adhesive resin 61, the first adhesive 57 extends over the boundaries between the bared optical fibers and the coated optical fibers in the direction of the second axis Ax2 so that the coating ends 45e located at the boundaries can be covered with a single resin. In addition, the first resin body 17, as well as the second resin body 19, can be disposed in contact with the second member 43 and can protect the bared optical fibers extending out of the second member 43.

Next, the method of manufacture will be specifically described. In this example, the first portions 45a of the optical fiber component 45 each include a first bared optical fiber 53a. The second portions 45b of the optical fiber component 45 each include a second bared optical fiber 53b and a first coated optical fiber 53c. The third portions 45c of the optical fiber component 45 each include a second coated optical fiber 53d. The first bared optical fibers 53a, the second bared optical fibers 53b, the first coated optical fibers 53c, and the second coated optical fibers 53d are arranged in sequence in the direction of the waveguide axis.

A method of manufacture according to Example 1 does not use the adhesive resin 61. Methods of manufacture according to Examples 2 and 3 use the adhesive resin 61.

Example 1

Figure 10A:
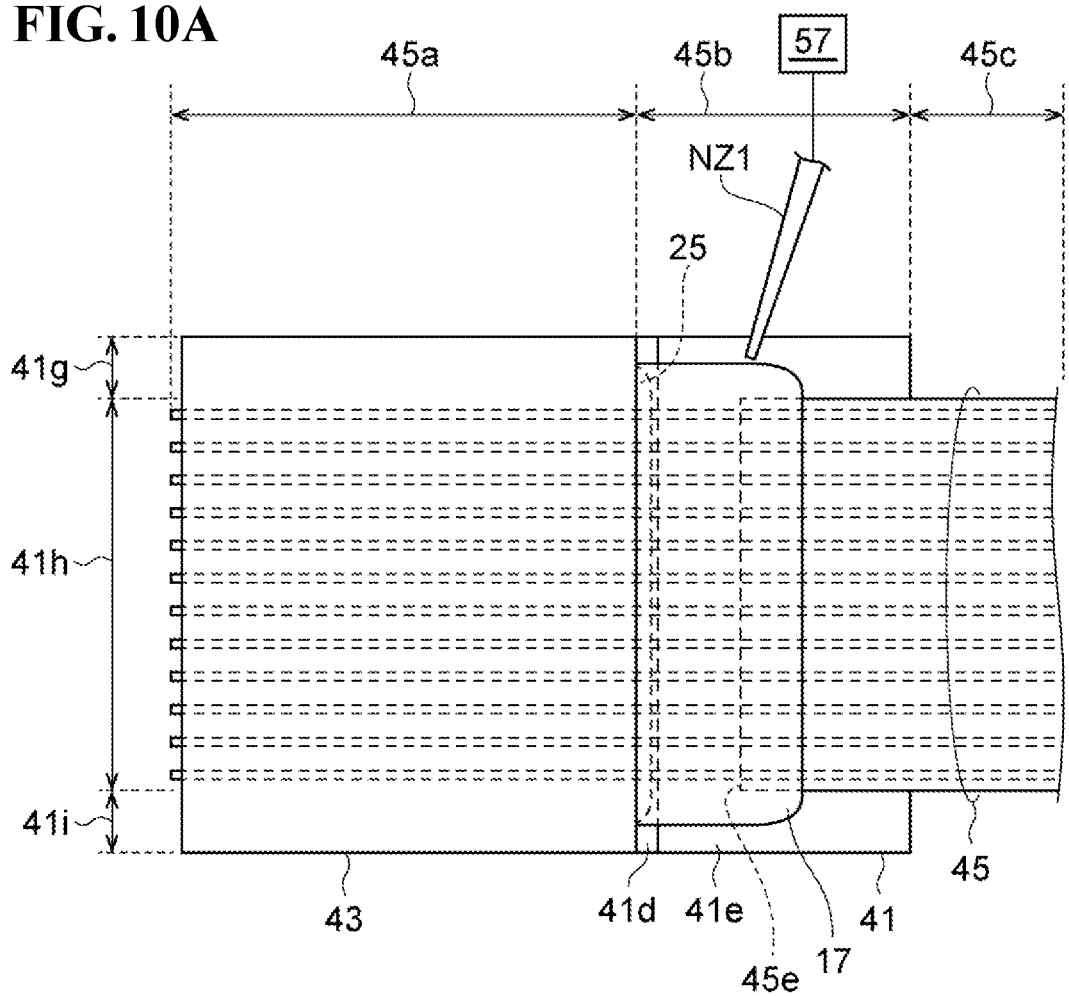
FIG. 10A schematically illustrates the main steps of the method for producing the optical coupling device according to the embodiment.
Figure 10B:
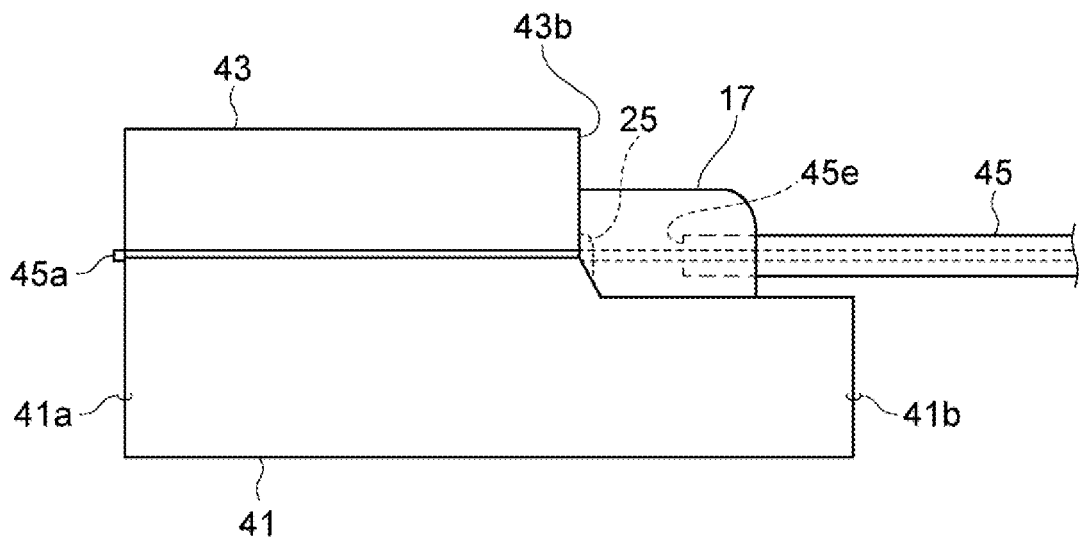
FIG. 10B schematically illustrates the main steps of the method for producing the optical coupling device according to the embodiment.

Referring to FIGS. 10A and 10B, the first adhesive 57 is dispensed onto the optical fiber component 45 and the second surface 41e. Specifically, the first adhesive 57 is applied to the optical fiber component 45 and the second surface 41e while the first nozzle NZ1 is being moved across the optical fiber component 45. The first adhesive 57 extends from one of the first outer portion 41g and the second outer portion 41i through the inner portion 41h to the other outer portion. In this example, the first adhesive 57 is applied so as to cover the adhesive resin body 25 and the coating ends 45e. The first adhesive 57 has a higher viscosity than the adhesive 47, i.e., 1,000 to 10,000 cP. A high viscosity facilitates retention of the shape of the applied adhesive.

The first adhesive 57 is solidified to form the first resin body 17 such that the optical fiber component 45 is separated from the second surface 41e. The first resin body 17 covers the adhesive resin body 25 and the coating ends 45e and is in contact with a rear end surface 43b of the second member 43.

Figure 11A:
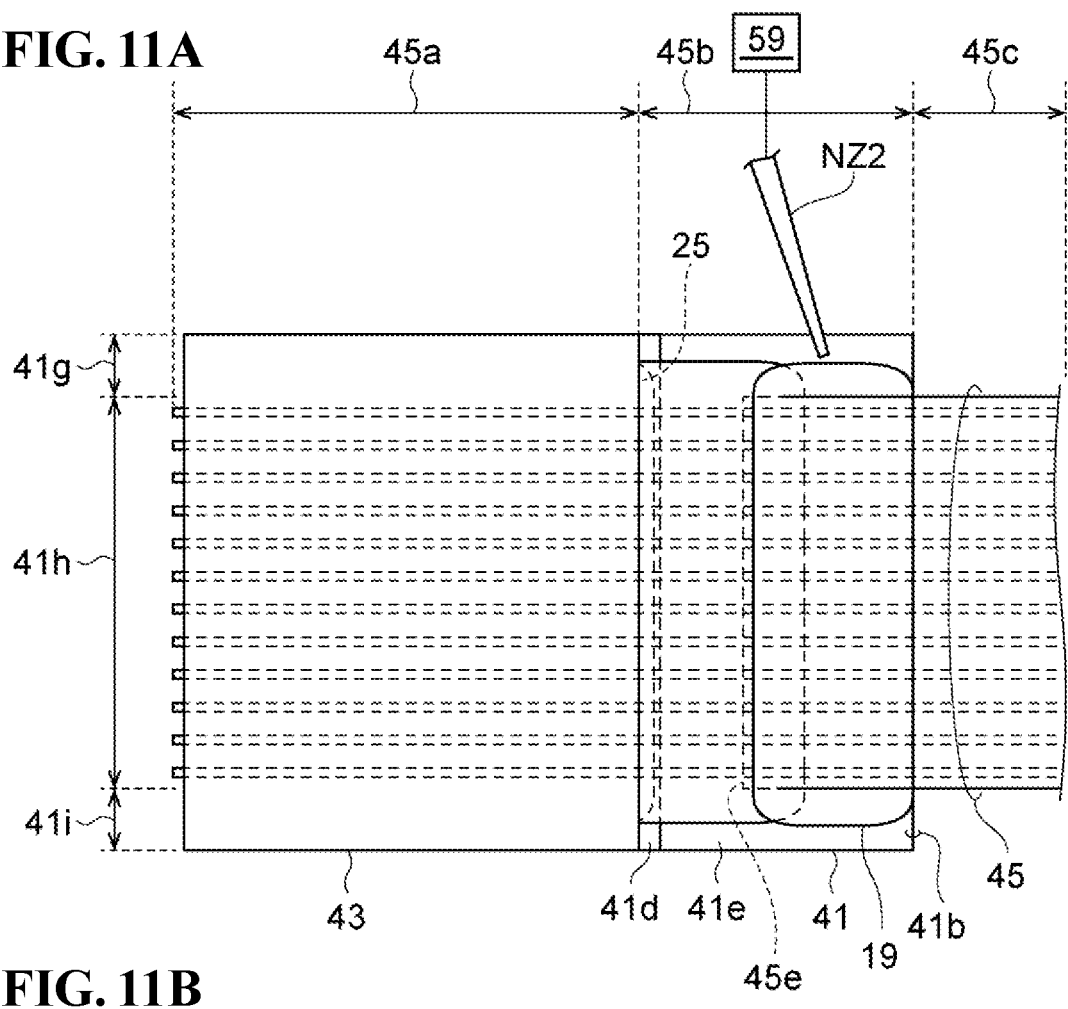
FIG. 11A schematically illustrates the main steps of the method for producing the optical coupling device according to the embodiment.
Figure 11B:
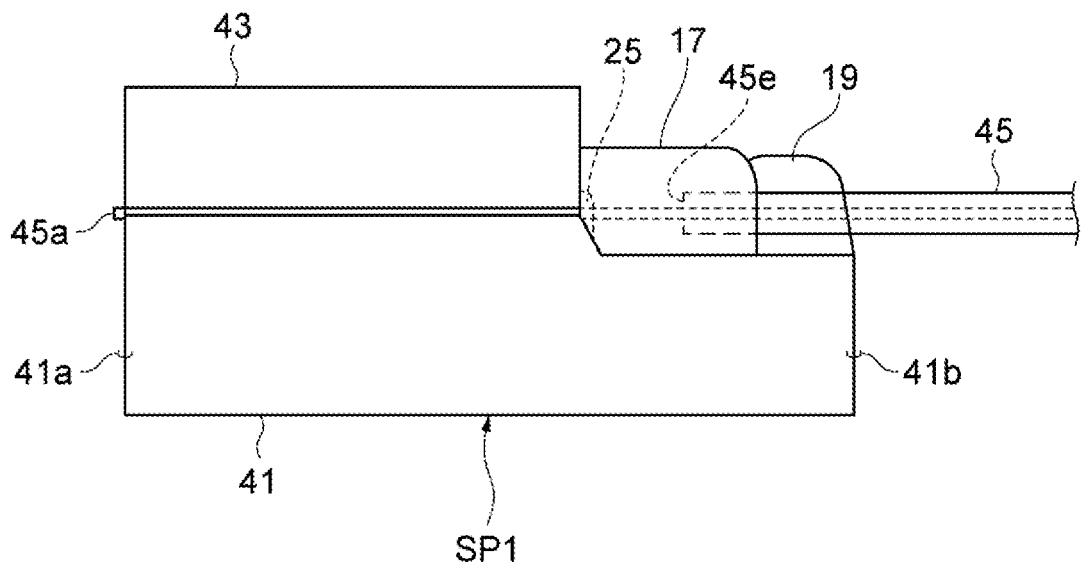
FIG. 11B schematically illustrates the main steps of the method for producing the optical coupling device according to the embodiment.

Referring to FIGS. 11A and 11B, the second adhesive 59 is dispensed onto the optical fiber component 45 and the second surface 41e. Specifically, the second adhesive 59 is applied to the optical fiber component 45 and the second surface 41e while the second nozzle NZ2 is being moved across the optical fiber component 45 along the second end 41b. The second adhesive 59 extends from one of the first outer portion 41g and the second outer portion 41i through the inner portion 41h to the other outer portion. In this example, the second adhesive 59 is applied so as to come into contact with and cover the rear end of the first resin body 17 and the first coated optical fibers 53c (the first coated optical fibers 53c extending out of the first resin body 17). The second adhesive 59 does not extend beyond the second end 41b. The second adhesive 59 extends annularly around the coating resin body 51 of the optical fiber component 45 so as to surround the optical fibers 53. The viscosity of the second adhesive 59 allows the shape of the applied adhesive to be retained. The second adhesive 59 has a higher viscosity than the adhesive 47, i.e., 1,000 to 10,000 cP.

The second adhesive 59 is solidified to form the second resin body 19 such that the optical fiber component 45 is separated from the second surface 41e. The second resin body 19 covers the coating resin body 51 of the optical fiber component 45 and is in contact with the second surface 41e of the first member 41.

Through these steps, the first member 41, the second member 43, and the optical fiber component 45 can be secured to each other with a plurality of adhesives to produce an intermediate product SP1.

In the method for producing the optical coupling device, the first resin body 17 and the second resin body 19 are formed. The first resin body 17, which has a higher Young's modulus, is in contact with the second portions 45b of the optical fiber component 45 and the first member 41. The first resin body 17 can thus secure the optical fiber component 45 to the first member 41 so as to resist the force component, in the direction of the waveguide axis, of force applied from the third portions 45c of the optical fiber component 45 to the second portions 45b of the optical fiber component 45. The second resin body 19, which has a lower Young's modulus, can secure the optical fiber component 45 to the first member 41 so as to resist the force component in a direction crossing the waveguide axis. In addition, the second resin body 19 extends along the second end 41b of the first member 41 so as to cover the second portions 45b of the optical fiber component 45. The second resin body 19 can thus secure the optical fiber component 45 to the first member 41 so as to resist external force. In addition, the second resin body 19 has less tendency to transmit the deformation (e.g., thermal deformation) of the first member 41 to the optical fiber component 45. Since the optical fiber component 45 is separated from the first member 41 by the adhesives, the second portions 45b of the optical fiber component 45 are less susceptible to the deformation of the first member 41.

Example 2

Example 2 uses a coating adhesive 63 as the adhesive resin 61.

Figure 12A:
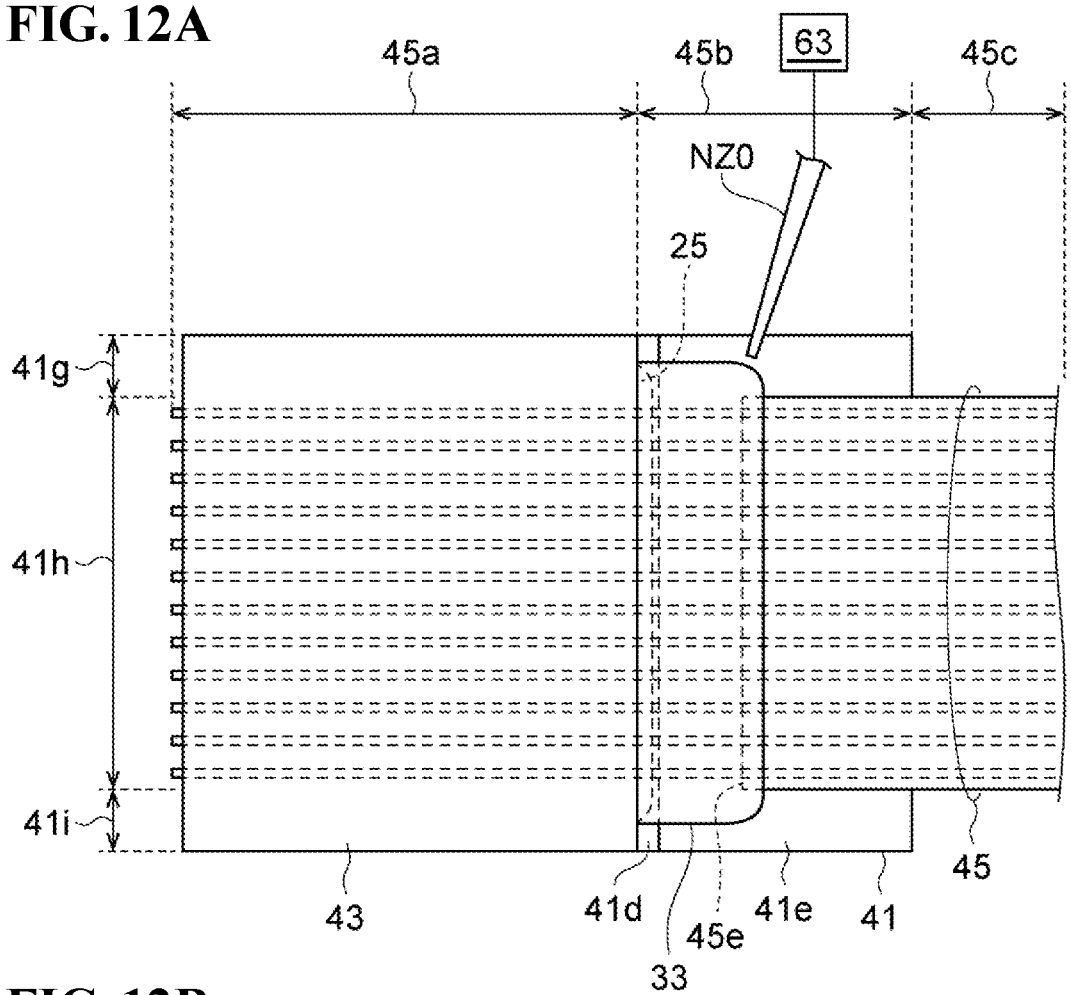
FIG. 12A schematically illustrates the main steps of the method for producing the optical coupling device according to the embodiment.
Figure 12B:
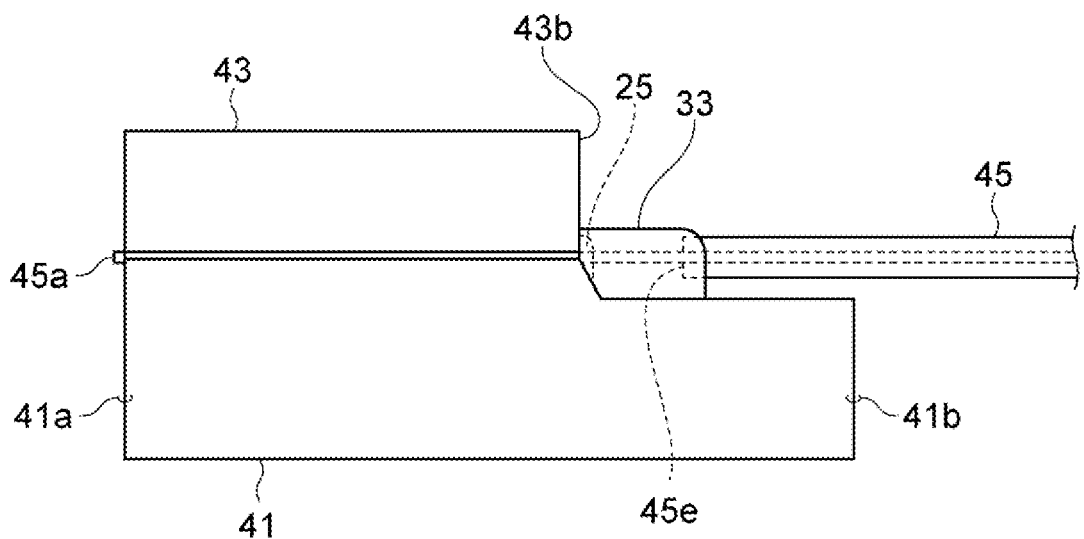
FIG. 12B schematically illustrates the main steps of the method for producing the optical coupling device according to the embodiment.

As shown in FIGS. 12A and 12B, the coating adhesive 63 is dispensed onto the optical fiber component 45 and the second surface 41e before the application of the first adhesive 57. Specifically, the coating adhesive 63 is applied to the optical fiber component 45 and the second surface 41e while a nozzle NZ0 is being moved across the optical fiber component 45. The coating adhesive 63 extends from one of the first outer portion 41g and the second outer portion 41i through the inner portion 41h to the other outer portion. The coating adhesive 63 is applied so as to cover the adhesive resin body 25 and the coating ends 45e and is in contact with the rear end surface 43b of the second member 43.

The coating adhesive 63 has a viscosity of 100 to 10,000 cP. In this example, the coating adhesive 63 contains substantially the same adhesive resin as the adhesive 47. The coating adhesive 63 is applied after the formation of the adhesive resin body 25 and before the application of the first adhesive 57. The coating adhesive 63 can contain the same type of resin and can be applied from the same nozzle as the adhesive for the adhesive resin body 25.

The coating adhesive 63 is solidified to form the third resin body 33 such that the optical fiber component 45 is separated from the second surface 41e. The third resin body 33 covers the adhesive resin body 25 and the coating ends 45e and is in contact with the rear end surface 43b of the second member 43.

Figure 13A:
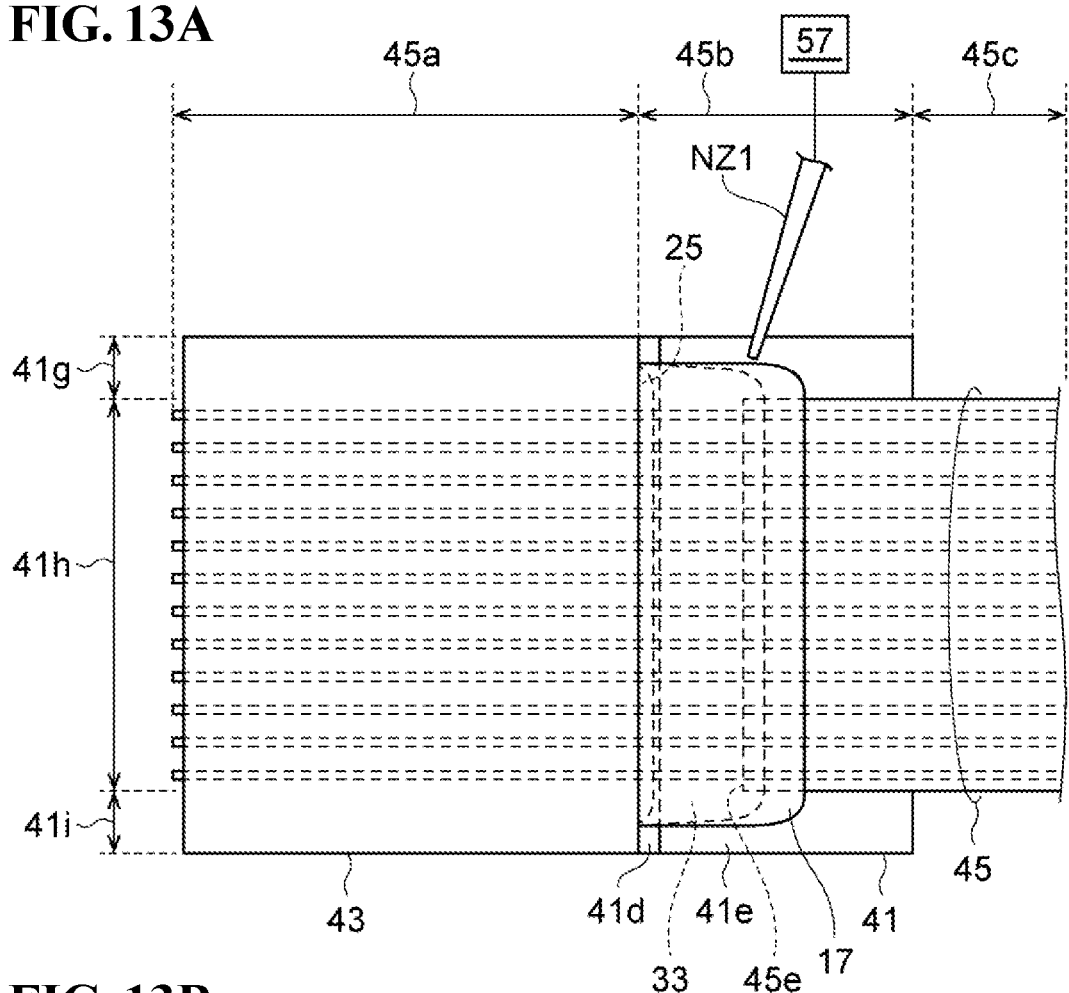
FIG. 13A schematically illustrates the main steps of the method for producing the optical coupling device according to the embodiment.
Figure 13B:
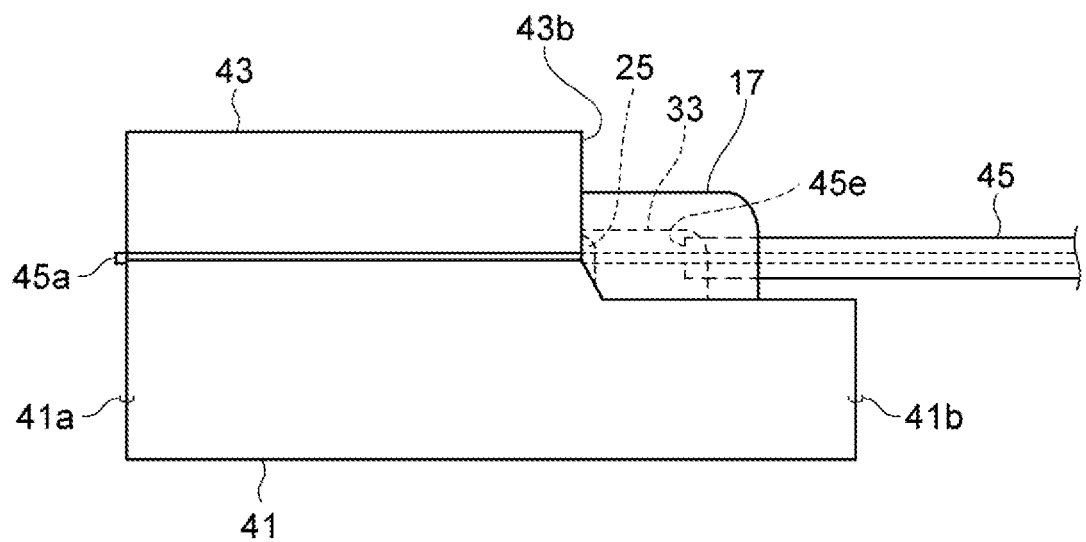
FIG. 13B schematically illustrates the main steps of the method for producing the optical coupling device according to the embodiment.

Referring to FIGS. 13A and 13B, the first adhesive 57 is dispensed onto the optical fiber component 45 and the second surface 41e. Specifically, the first adhesive 57 is applied to the optical fiber component 45 and the second surface 41e while the first nozzle NZ1 is being moved across the optical fiber component 45. The first adhesive 57 extends from one of the first outer portion 41g and the second outer portion 41i through the inner portion 41h to the other outer portion at a distance from the second end 41b. In this example, the first adhesive 57 is applied so as to cover the third resin body 33 and the first coated optical fibers 53c (the first coated optical fibers 53c extending out of the third resin body 33) at a distance from the second end 41b.

The first adhesive 57 is solidified to form the first resin body 17 such that the optical fiber component 45 is separated from the second surface 41e. The first resin body 17 extends so as to cover the third resin body 33 covering the adhesive resin body 25 and the coating ends 45e and is in contact with the rear end surface 43b of the second member 43.

Figure 14A:
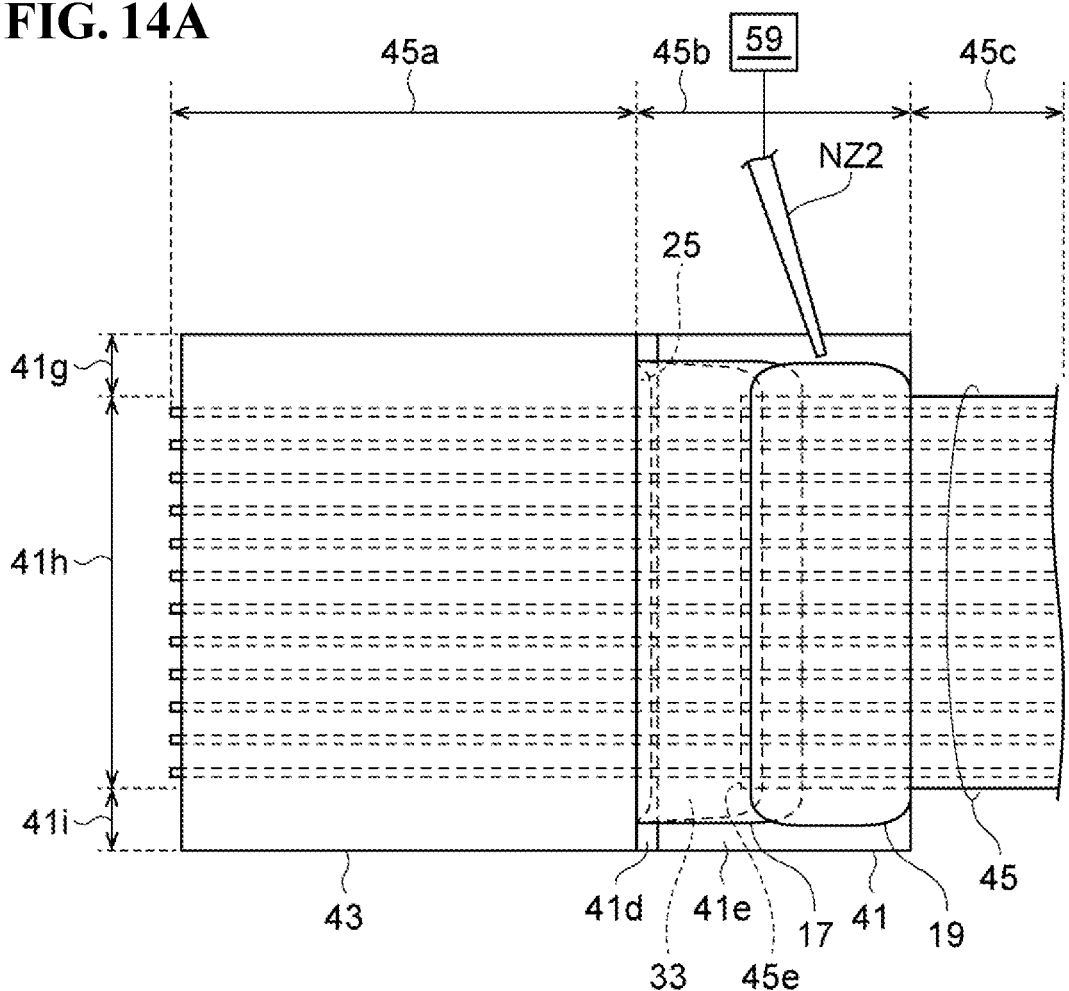
FIG. 14A schematically illustrates the main steps of the method for producing the optical coupling device according to the embodiment.
Figure 14B:
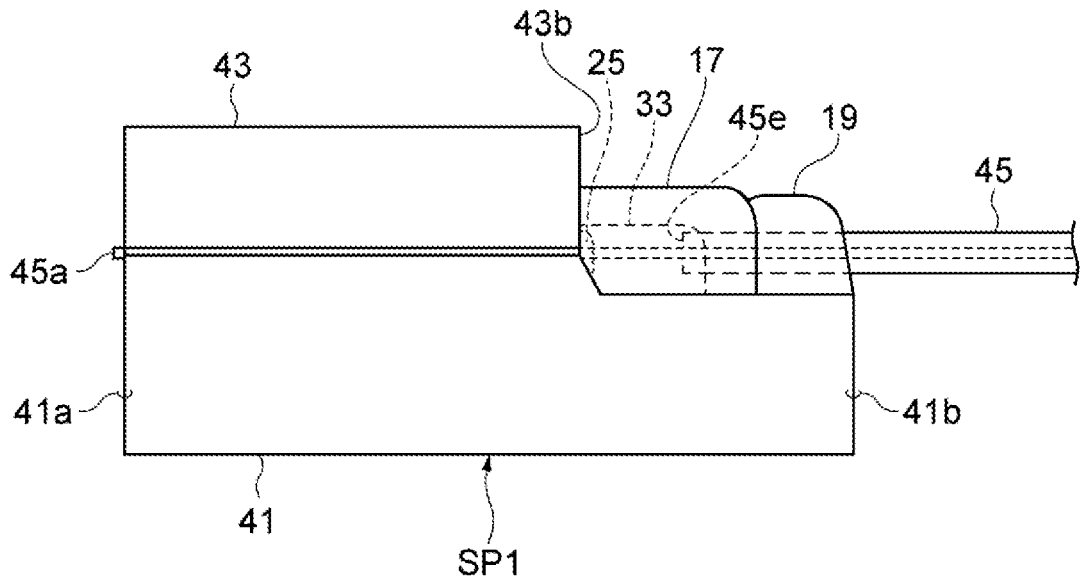
FIG. 14B schematically illustrates the main steps of the method for producing the optical coupling device according to the embodiment.

Referring to FIGS. 14A and 14B, after the formation of the first resin body 17, the second adhesive 59 is dispensed onto the optical fiber component 45 and the second surface 41e. Specifically, the second adhesive 59 is applied to the optical fiber component 45 and the second surface 41e while the second nozzle NZ2 is being moved across the optical fiber component 45 along the second end 41b. The second adhesive 59 extends from one of the first outer portion 41g and the second outer portion 41i through the inner portion 41h to the other outer portion. The second adhesive 59 extends annularly around the coating resin body 51 of the optical fiber component 45 so as to surround the optical fibers 53. In this example, the second adhesive 59 is applied so as to cover the rear end of the first resin body 17 and the first coated optical fibers 53c (the first coated optical fibers 53c extending out of the first resin body 17). The second adhesive 59 does not extend beyond the second end 41b. The third resin body 33 has a higher Young's modulus than the second resin body 19.

The second adhesive 59 is solidified to form the second resin body 19 such that the optical fiber component 45 is separated from the second surface 41e. The second resin body 19 covers the coating resin body 51 of the optical fiber component 45 and is in contact with the second surface 41e of the first member 41.

Through these steps, the first member 41, the second member 43, and the optical fiber component 45 can be secured to each other with a plurality of adhesives to produce an intermediate product SP1.

In the method for producing the optical coupling device, the third resin body 33, which has a higher Young's modulus, is in contact with the second bared optical fibers 53b and the first member 41. The third resin body 33 can thus secure the optical fiber component 45 to the first member 41. The coating adhesive 63 covers the coating ends 45e at the boundaries between the second bared optical fibers 53b and the first coated optical fibers 53c. The coating adhesive 63 can thus prevent the first resin body 17 and the second resin body 19, which resist external force, from being in contact with the optical fiber boundaries and the second bared optical fibers 53b. The coating ends 45e are covered by the third resin body 33, which is different from the resin body that is directly subjected to force from the second coated optical fibers 53d, i.e., the second resin body 19. The third resin body 33, which has a higher Young's modulus, can secure the second bared optical fibers 53b and the optical fiber boundaries to the second member 43. In addition, the third resin body 33 can firmly secure the coating ends 45e and the portions on the front and rear sides thereof to the first member 41 independently of the first resin body 17.

Example 3

Example 3 uses a third adhesive 65 as the adhesive resin 61.

Figure 15A:
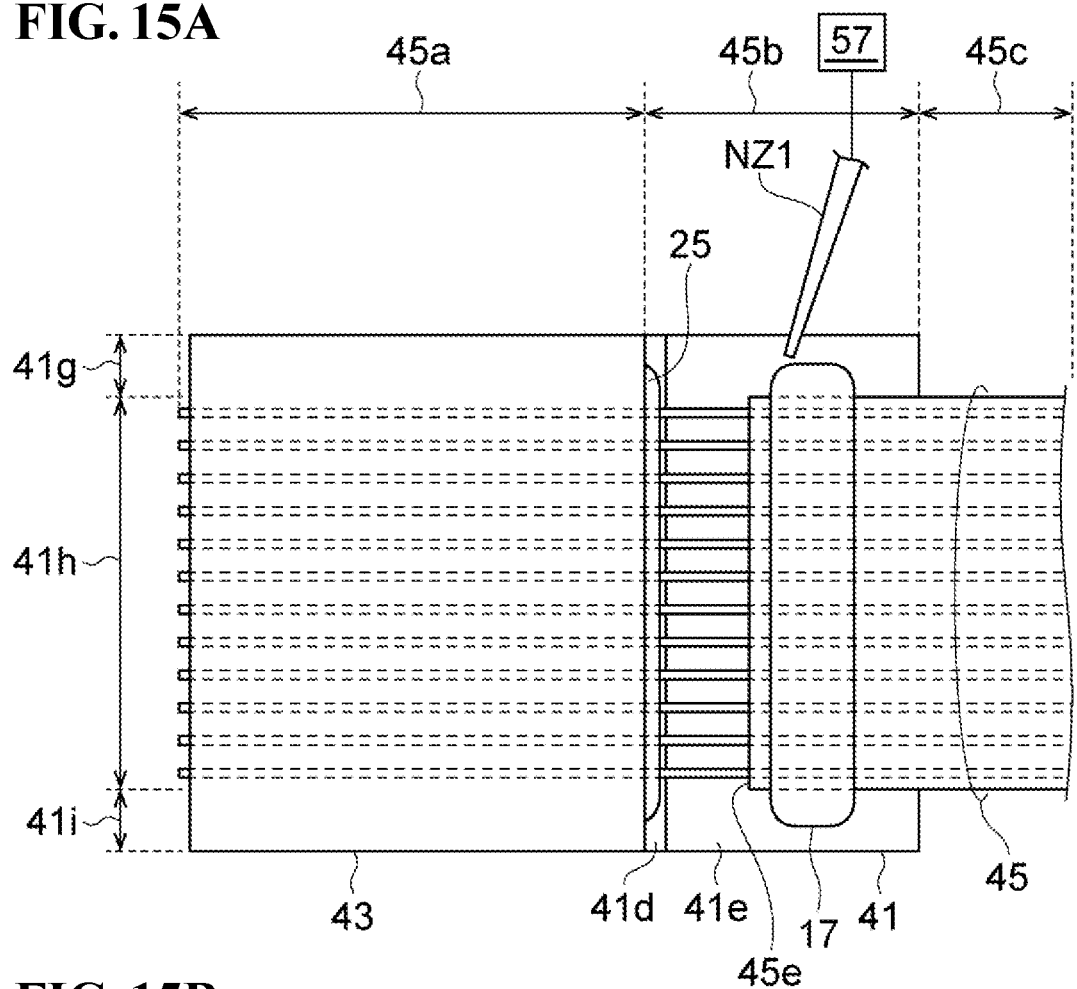
FIG. 15A schematically illustrates the main steps of the method for producing the optical coupling device according to the embodiment.
Figure 15B:
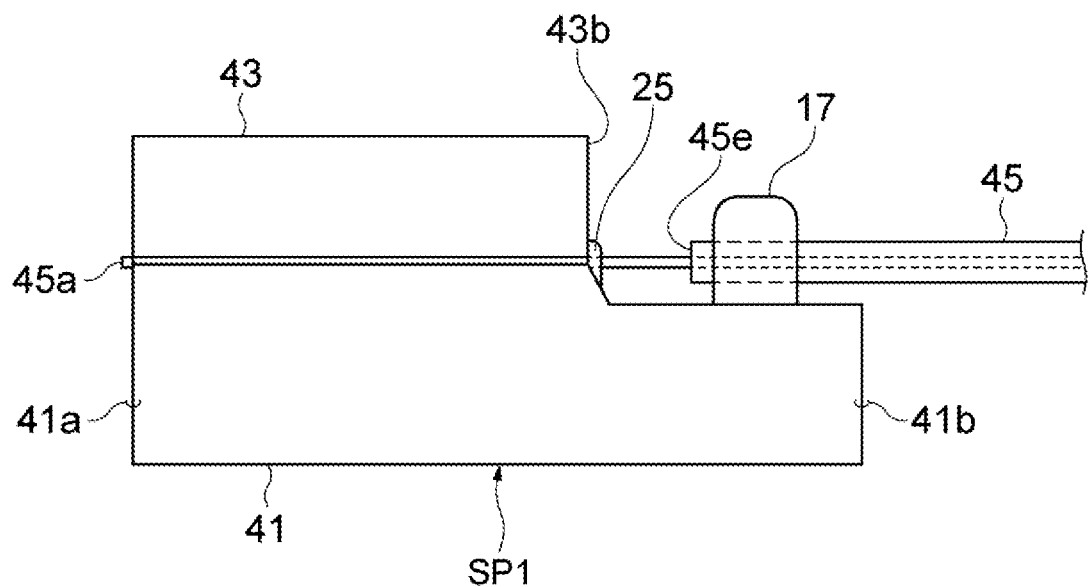
FIG. 15B schematically illustrates the main steps of the method for producing the optical coupling device according to the embodiment.

As shown in FIGS. 15A and 15B, the first adhesive 57 is dispensed onto the optical fiber component 45 and the second surface 41e. Specifically, the first adhesive 57 is applied to the optical fiber component 45 and the second surface 41e while the first nozzle NZ1 is being moved across the optical fiber component 45. The first adhesive 57 extends from one of the first outer portion 41g and the second outer portion 41i through the inner portion 41h to the other outer portion at a distance from the second end 41b. In this example, the first adhesive 57 is applied so as to annularly cover the coating resin body 51 of the first coated optical fibers 53c.

The first adhesive 57 is solidified to form the first resin body 17 such that the optical fiber component 45 is separated from the second surface 41e. The first resin body 17 is separated from the rear end surface 43b of the second member 43, the adhesive resin body 25, and the coating ends 45e.

Figure 16A:
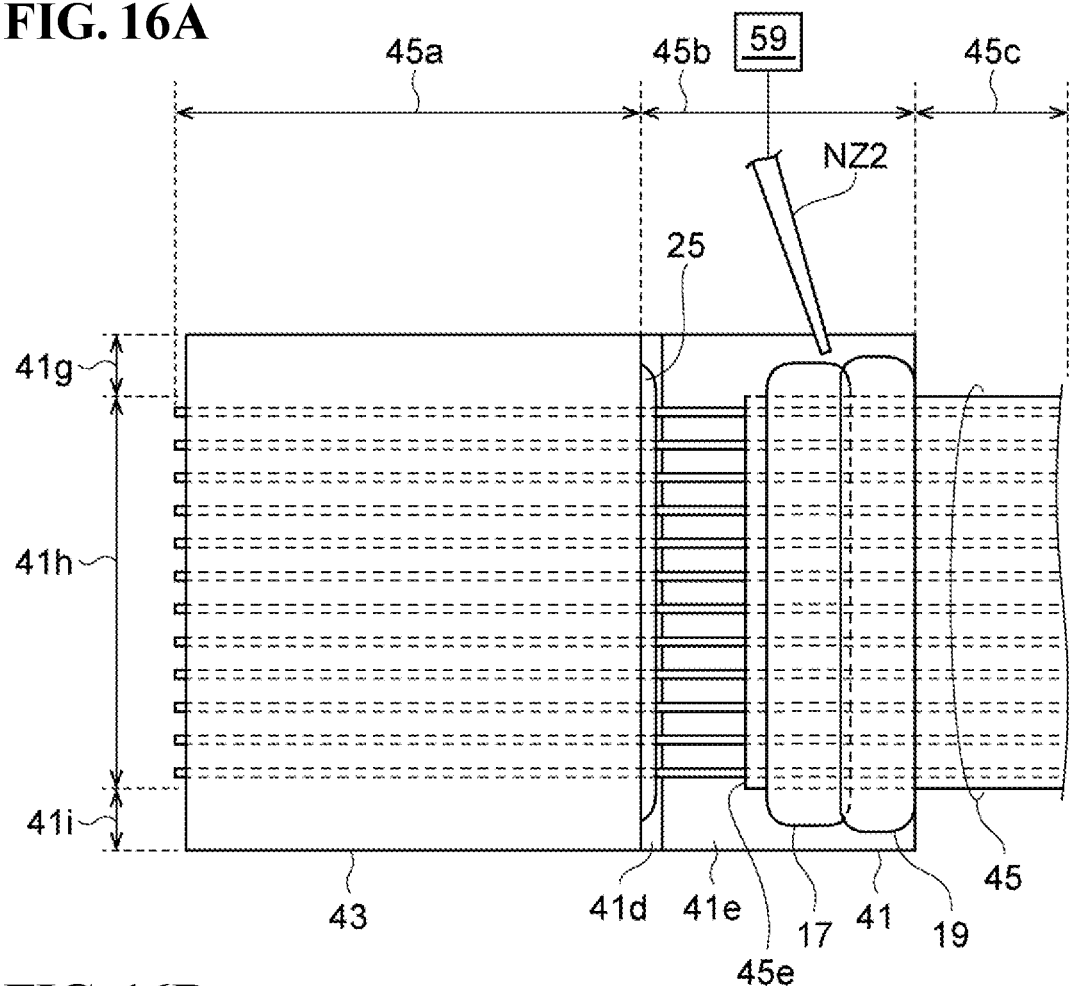
FIG. 16A schematically illustrates the main steps of the method for producing the optical coupling device according to the embodiment.
Figure 16B:
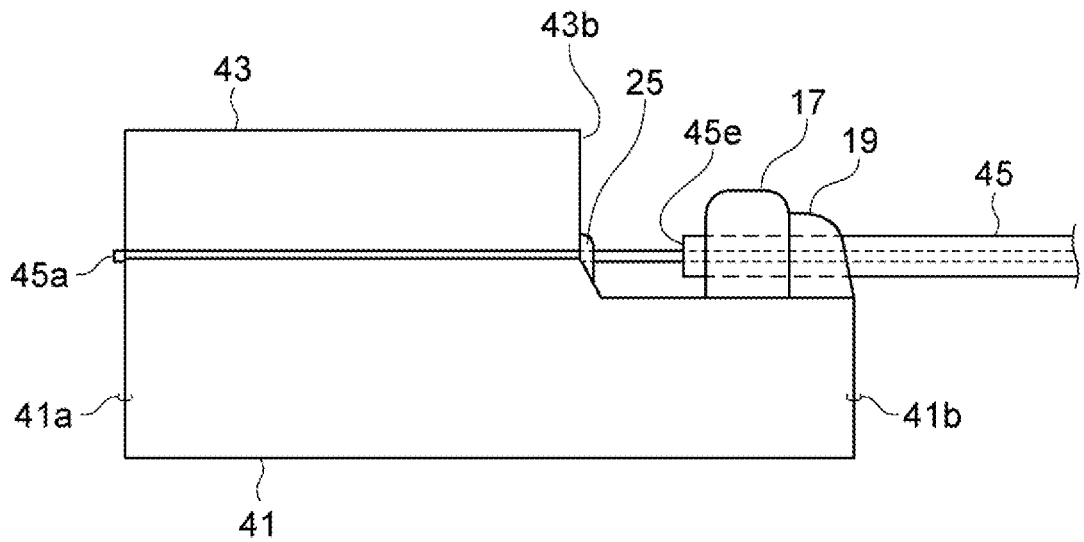
FIG. 16B schematically illustrates the main steps of the method for producing the optical coupling device according to the embodiment.

Referring to FIGS. 16A and 16B, after the formation of the first resin body 17, the second adhesive 59 is dispensed onto the optical fiber component 45 and the second surface 41e. Specifically, the second adhesive 59 is applied to the optical fiber component 45 and the second surface 41e while the second nozzle NZ2 is being moved across the optical fiber component 45 along the second end 41b. The second adhesive 59 extends from one of the first outer portion 41g and the second outer portion 41i through the inner portion 41h to the other outer portion. The second adhesive 59 extends annularly around the coating resin body 51 of the optical fiber component 45 so as to surround the optical fibers 53. In this example, the second adhesive 59 is applied so as to cover the rear end of the first resin body 17 and the first coated optical fibers 53c (the first coated optical fibers 53c extending out of the first resin body 17). The second adhesive 59 does not extend beyond the second end 41b.

The second adhesive 59 is solidified to form the second resin body 19 such that the optical fiber component 45 is separated from the second surface 41e. The second resin body 19 annularly covers the coating resin body 51 of the optical fiber component 45 and is in contact with the second surface 41e of the first member 41.

Figure 17A:
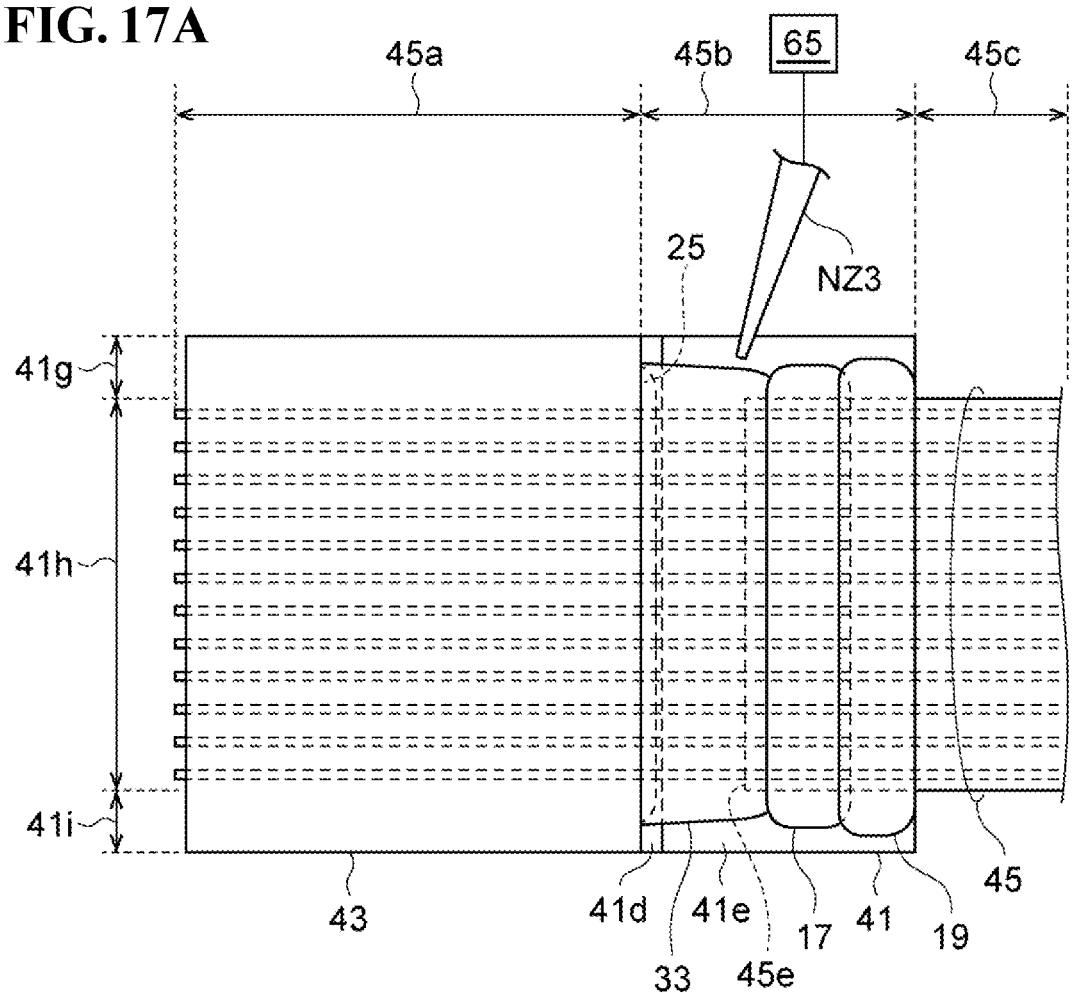
FIG. 17A schematically illustrates the main steps of the method for producing the optical coupling device according to the embodiment.
Figure 17B:
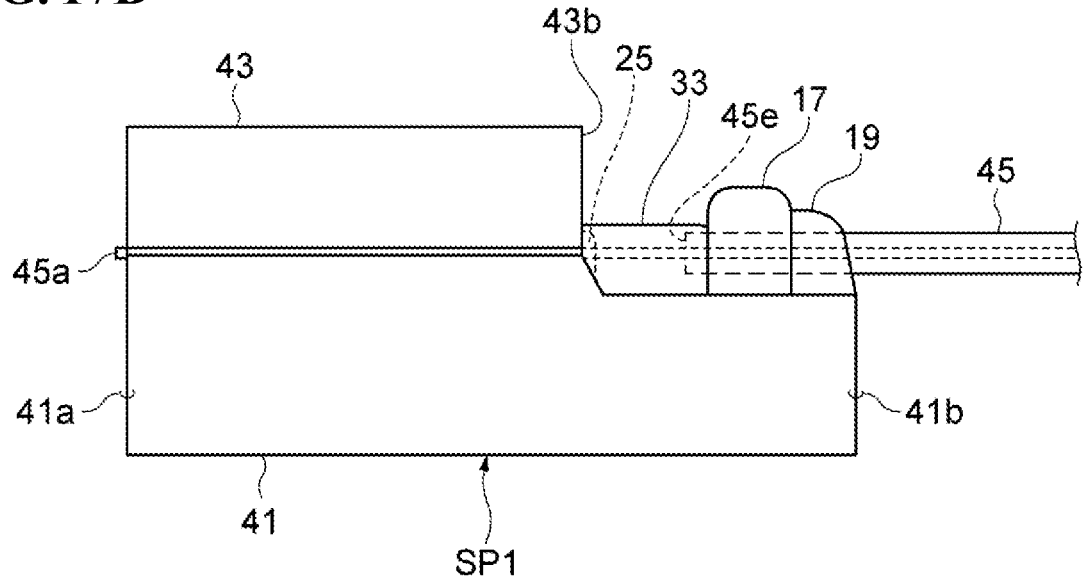
FIG. 17B schematically illustrates the main steps of the method for producing the optical coupling device according to the embodiment.

Referring to FIGS. 17A and 17B, after the formation of the first resin body 17 and the second resin body 19, the third adhesive 65 is dispensed onto the optical fiber component 45 and the second surface 41e. Specifically, the third adhesive 65 is applied to the optical fiber component 45 and the second surface 41e while a third nozzle NZ3 is being moved across the optical fiber component 45. The third adhesive 65 extends from one of the first outer portion 41g and the second outer portion 41i through the inner portion 41h to the other outer portion. The third adhesive 65 is applied so as to cover the adhesive resin body 25 and the coating ends 45e and is in contact with the rear end surface 43b of the second member 43. The third adhesive 65 has a viscosity of 1,000 to 10,000 cP.

The third adhesive 65 is solidified to form the third resin body 33 such that the optical fiber component 45 is separated from the second surface 41e. The third resin body 33 covers the adhesive resin body 25 and the coating ends 45e and is in contact with the rear end surface 43b of the second member 43.

Through these steps, the first member 41, the second member 43, and the optical fiber component 45 can be secured to each other with a plurality of adhesives to produce an intermediate product SP1.

In the method for producing the optical coupling device, the first resin body 17 is in contact with the first coated optical fibers 53c and the first member 41. The first resin body 17 can thus secure the optical fiber component 45 to the first member 41. The third adhesive 65 covers the coating ends 45e at the boundaries between the second bared optical fibers 53b and the first coated optical fibers 53c. The third adhesive 65 can thus prevent the first resin body 17 and the second resin body 19, which resist external force, from being in contact with the optical fiber boundaries and the second bared optical fibers 53b. The coating ends 45e are covered by the third resin body 33, which is different from the resin body that is directly subjected to force from the second coated optical fibers 53d, i.e., the second resin body 19. The third resin body 33, which has a lower Young's modulus, reaches the second member 43 so as to cover the adhesive resin body 25. The third resin body 33 can thus secure the second bared optical fibers 53b and the optical fiber boundaries to the first member 41 and the second member 43. In addition, the third resin body 33 has less tendency to transmit the deformation of the first member 41 to the optical fiber component 45. When force acts externally toward the second bared optical fibers 53b or the optical fiber boundaries, the third resin body 33 deforms and absorbs the force, thereby preventing the optical fibers 53 from being damaged.

The intermediate product SP1 produced by any of the methods of manufacture according to Example 1, Example 2, and Example 3 is processed to form the optical coupling end surface 15a. In the intermediate product SP1, the first bared optical fibers 53a protrude from the first member 41 and the second member 43. For example, the optical coupling device 11 shown in FIGS. 1A to 3B can be produced by polishing the first member 41, the second member 43, and the first bared optical fibers 53a.

If necessary, the optical coupling device 11 can be produced by further polishing. Such processing provides an optical coupling device 11 as shown in FIGS. 18A to 19.

FIGS. 18A, 18B, 18C, and 18D illustrate the optical coupling device according to the embodiment.

Figure 18A:
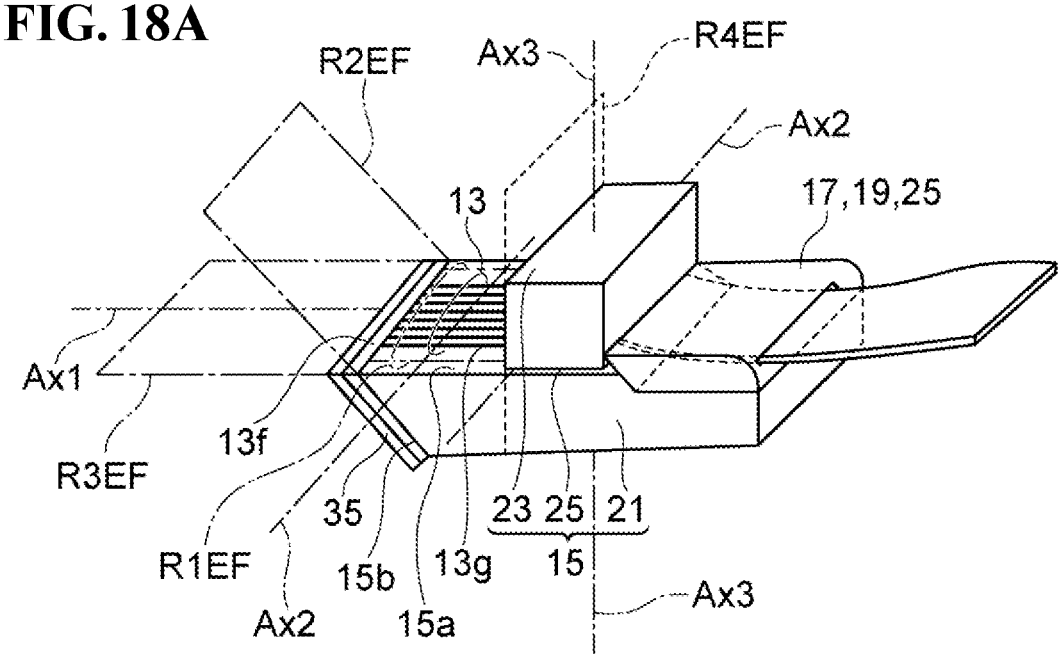
FIG. 18A illustrates the optical coupling device according to the embodiment.
Figure 18B:
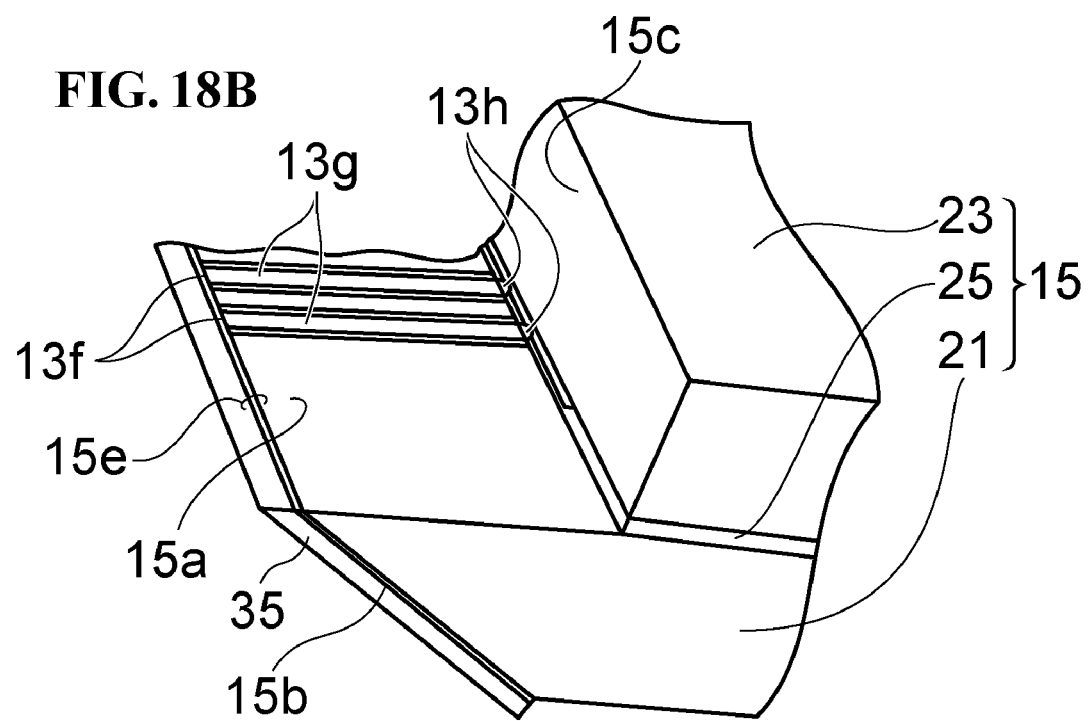
FIG. 18B illustrates the optical coupling device according to the embodiment.
Figure 19:
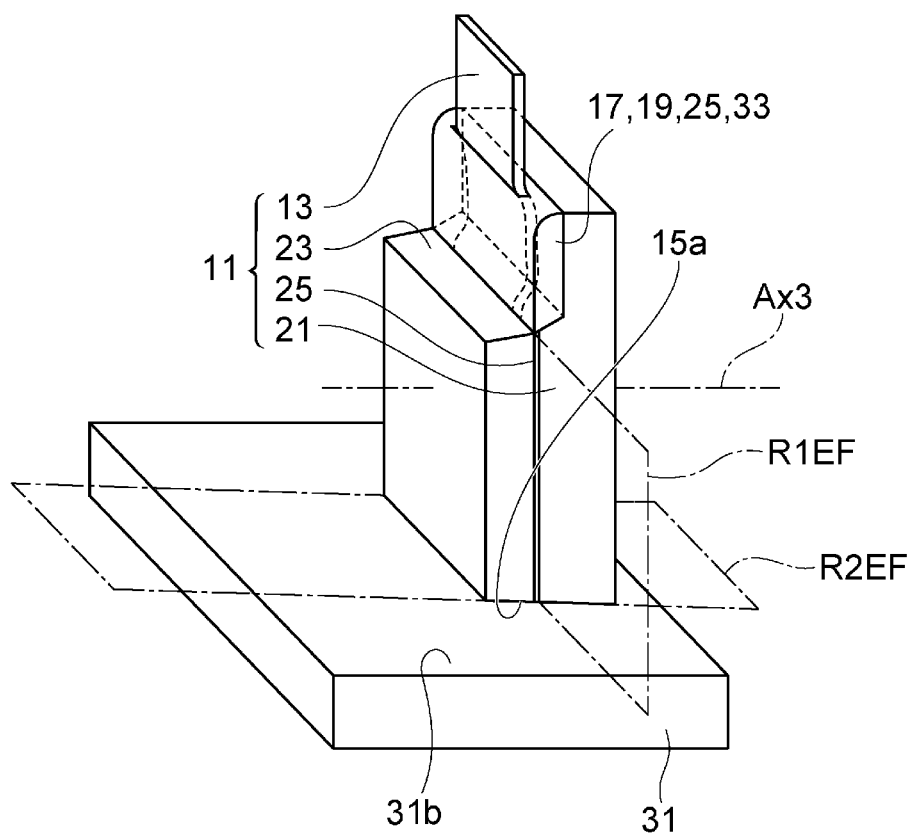
FIG. 19 illustrates the optical coupling device according to the embodiment.

Referring to FIGS. 18A and 18B, the optical fibers 13 are arranged in a first reference plane R1EF crossing a third axis Ax3 (an axis crossing the first axis Ax1 and the second axis Ax2). The holder 15 has a front end surface 15b (the front end surface of the first component 21) extending in a second reference plane R2EF crossing the first reference plane R1EF. The optical fibers 13 each have a leading end 13f located at the front end surface 15b.

Each optical fiber 13 has a cladding side surface 13g extending from the leading end 13f of the optical fiber 13 in a third reference plane R3EF crossing the second reference plane R2EF. The cladding side surface 13g is separated from the core of the optical fiber 13. In addition, the holder 15 has an optical coupling end surface 15a extending from the front end surface 15b in the third reference plane R3EF. The leading ends 13f of the optical fibers 13 are arranged at an acute end 15e where the front end surface 15b meets the optical coupling end surface 15a.

Each optical fiber 13 has a cladding side surface 13h extending in a fourth reference plane R4EF crossing the first axis Ax1 and separated from the leading end 13f of the optical fiber 13. In addition, the holder 15 (second component 23) has a side end surface 15c separated from the front end surface 15b in the fourth reference plane R4EF. The optical coupling end surface 15a joins the front end surface 15b to the side end surface 15c. The front end surface 15b can make an angle of 30° to 60° with respect to the optical coupling end surface 15a. The side end surface 15c can make an angle of 90° to 135° with respect to the optical coupling end surface 15a. If necessary, the optical coupling device 11 has a light reflective component 35 on the front end surface 15b. The light reflective component 35 includes, for example, a high-reflectivity film such as a gold film.

Figure 18C:
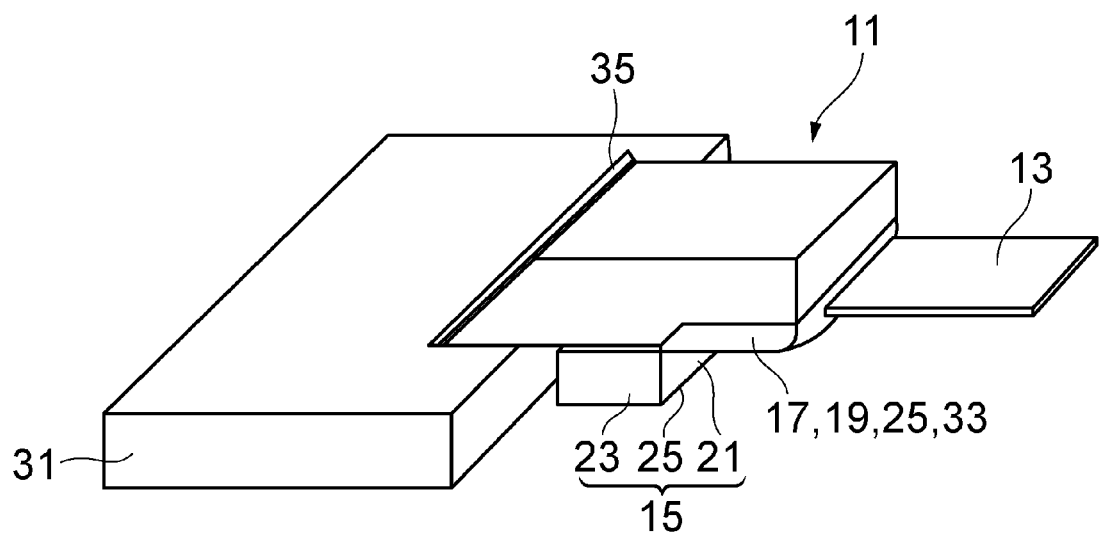
FIG. 18C illustrates the optical coupling device according to the embodiment.

Referring to FIG. 18C, the optical coupling device 11 is optically coupled to an optical coupling element 31a of a semiconductor optical device 31 via the cladding side surface 13g.

Figure 18D:
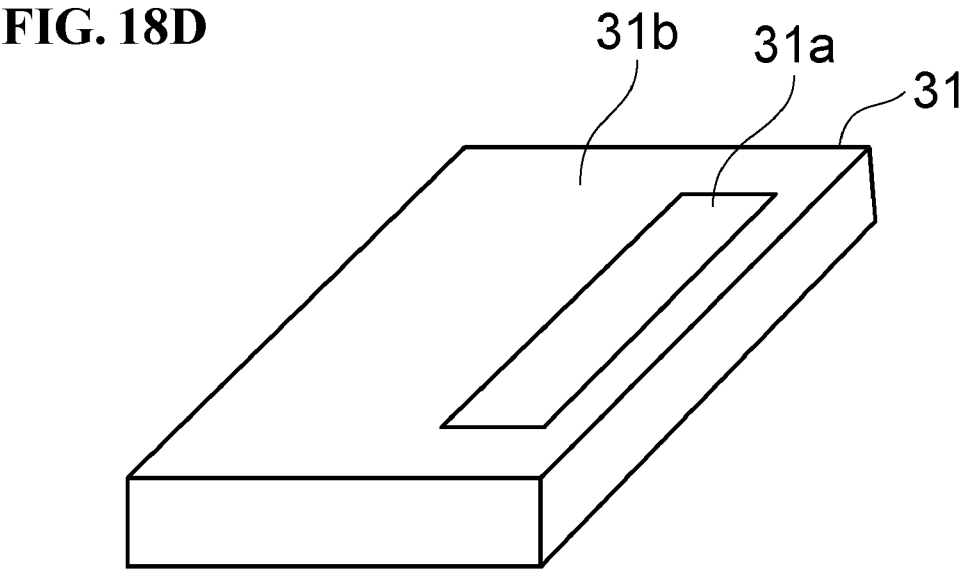
FIG. 18D illustrates the optical coupling device according to the embodiment.

Referring to FIG. 18D, the semiconductor optical device 31 has on a main surface 31b thereof the optical coupling element 31a, such as an optical coupler for optical coupling to the leading ends 13f of the optical fibers 13 of the optical coupling device 11.

The optical coupling device 11 allows the array of the leading ends 13f of the optical fibers 13 to be optically coupled to an external device via the cladding side surface 13g.

FIG. 19 illustrates the optical coupling device according to the embodiment. The optical fibers 13 are arranged in the first reference plane R1EF crossing the third axis Ax3. The holder 15 (the first component 21 and the second component 23) has a front end surface 15b extending in the second reference plane R2EF crossing the first reference plane R1EF. The front end surface 15b can be inclined at an angle of, for example, 60° to 90° with respect to the first reference plane R1EF. The first component 21 and the second component 23 extend from the front end surface 15b of the holder 15 in a direction crossing the main surface 31b of the semiconductor optical device 31. The optical fibers 13 each have a leading end 13f located at the front end surface 15b of the first component 21 and the second component 23.

The optical coupling device 11 allows the array of the leading ends 13f of the optical fibers 13 to be optically coupled to an external device. Specifically, the optical coupling device 11 is optically coupled to the optical coupling element 31a, such as the optical coupler of the semiconductor optical device 31, for example, a silicon photonic element, via the front end surface 15b.

Whereas the principles of the present invention have been illustrated and described with reference to a preferred embodiment, one skilled in the art would appreciate that modifications can be made to arrangements and details without departing from the principles of the invention. The invention is not limited to any particular configuration disclosed in the embodiment. Thus, all changes and modifications that come within the scope and spirit of the claims are to be claimed.

What is claimed is:

1. An optical coupling device comprising:
  a plurality of optical fibers, each including a first bared optical fiber portion, a second bared optical fiber portion, a first coated optical fiber portion, and a second coated optical fiber portion that are arranged in sequence in a direction of a waveguide axis;
  a holder including
    a first component having a front end and a rear end and having a first surface, a step, and a second surface that are arranged in a first direction from the front end toward the rear end,
    a second component disposed on the first surface of the first component and the first bared optical fiber portions and separated from the second surface of the first component, and
    an adhesive resin body disposed between the first surface of the first component and the second component;
  a first resin body in contact with the first coated optical fiber portions and the first component;
  a second resin body extending along the rear end of the first component and covering the first coated optical fiber portions; and
  a third resin body disposed between the adhesive resin body and the second resin body, wherein
  the first resin body is disposed between the adhesive resin body and the second resin body,
  the second coated optical fiber portions extend out of the holder,
  the second resin body has a lower Young's modulus than the first resin body, and
  the third resin body covers boundaries between the second bared optical fiber portions and the first coated optical fiber portions.

2. The optical coupling device according to claim 1, wherein
  the first resin body is in contact with the second resin body,
  the first resin body extends over the second bared optical fiber portions and the first coated optical fiber portions in a second direction crossing the first direction, and
  the first resin body covers the adhesive resin body and is in contact with the second component and the adhesive resin body.

3. The optical coupling device according to claim 1, wherein
  the first resin body covers the third resin body so as to reach the second component, and
  the third resin body has a higher Young's modulus than the second resin body.

4. The optical coupling device according to claim 1, wherein
  the first resin body is separated from the boundaries between the second bared optical fiber portions and the first coated optical fiber portions and from the second component,
  the third resin body covers the adhesive resin body and is in contact with the second component, and
  the third resin body has a higher Young's modulus than the second resin body.

5. The optical coupling device according to claim 1, wherein the first coated optical fiber portions are separated from the second surface of the first component.

6. A method for producing an optical coupling device, comprising:
  providing a first member, a plurality of optical fibers, and a second member, the first member having a first end and a second end and having a first surface, a step, and a second surface that are arranged in a first direction from the first end toward the second end, the optical fibers each including a first portion, a second portion, and a third portion that are arranged in sequence in a direction of a waveguide axis;
  forming an adhesive resin body securing together the first portions of the optical fibers, the first member, and the second member such that the first portions and the second portions of the optical fibers are disposed over the first surface and the second surface, respectively;

after forming the adhesive resin body, dispensing a first adhesive onto the optical fibers and the second surface of the first member while moving a first nozzle over the second surface and the optical fibers at a distance from the second end of the first member, and solidifying the first adhesive to form a first resin body such that the optical fibers are separated from the second surface; and after forming the first resin body, dispensing a second adhesive onto the optical fibers and the second surface along the second end of the first member while moving a second nozzle across the optical fibers, and solidifying the second adhesive to form a second resin body such that the optical fibers are separated from the second surface, wherein the second resin body has a lower Young's modulus than the first resin body.

7. The method for producing an optical coupling device according to claim 6, wherein the first portions of the optical fibers each include a first bared optical fiber, the second portions of the optical fibers each include a second bared optical fiber and a first coated optical fiber, the third portions of the optical fibers each include a second coated optical fiber, the first bared optical fibers, the second bared optical fibers, the first coated optical fibers, and the second coated optical fibers are arranged in sequence in the direction of the waveguide axis, the first resin body is in contact with the second resin body, the first resin body extends over the second bared optical fibers in a second direction crossing the first direction, and the first resin body covers the adhesive resin body and is in contact with the second member and the adhesive resin body.

8. The method for producing an optical coupling device according to claim 6, wherein the first portions of the optical fibers each include a first bared optical fiber, the second portions of the optical fibers each include a second bared optical fiber and a first coated optical fiber, the third portions of the optical fibers each include a second coated optical fiber, the first bared optical fibers, the second bared optical fibers, the first coated optical fibers, and the second coated optical fibers are arranged in sequence in the direction of the waveguide axis, the method further comprises, after forming the first resin body and before forming the second resin body, dispensing a third adhesive onto the optical fibers and the second surface and solidifying the third adhesive to form a third resin body such that the optical fibers are separated from the second surface, the third adhesive is in contact with the first resin body and the second member, the third adhesive is dispensed onto coating ends located at boundaries between the second bared optical fibers and the first coated optical fibers while a third nozzle is being moved across the optical fibers, the third resin body covers the coating ends located at the boundaries between the second bared optical fibers and the first coated optical fibers, and the third resin body has a higher Young's modulus than the second resin body.

9. The method for producing an optical coupling device according to claim 6, wherein the first portions of the optical fibers each include a first bared optical fiber, the second portions of the optical fibers each include a second bared optical fiber and a first coated optical fiber, the third portions of the optical fibers each include a second coated optical fiber, the first bared optical fibers, the second bared optical fibers, the first coated optical fibers, and the second coated optical fibers are arranged in sequence in the direction of the waveguide axis, the method further comprises, after forming the second resin body and before forming the first resin body, dispensing a third adhesive onto the optical fibers and the second surface and solidifying the third adhesive to form a third resin body such that the optical fibers are separated from the second surface, the third adhesive is in contact with the first resin body and the second member, the third adhesive is dispensed onto coating ends located at boundaries between the second bared optical fibers and the first coated optical fibers while a third nozzle is being moved across the optical fibers, the third resin body covers the coating ends located at the boundaries between the second bared optical fibers and the first coated optical fibers, and the third resin body has a lower Young's modulus than the first resin body.

* * * * *